United States Patent
Kuratomi et al.

(10) Patent No.: US 6,791,566 B1
(45) Date of Patent: Sep. 14, 2004

(54) IMAGE DISPLAY DEVICE

(75) Inventors: Yasunori Kuratomi, Sanda (JP); Junko Asayama, Suita (JP); Akifumi Ogiwara, Hirakata (JP); Tsuyoshi Uemura, Kadoma (JP); Kazunori Komori, Sanda (JP)

(73) Assignee: Matsushita Electric Industrial Co., Ltd. (JP)

( * ) Notice: Subject to any disclaimer, the term of this patent is extended or adjusted under 35 U.S.C. 154(b) by 64 days.

(21) Appl. No.: 10/088,418

(22) PCT Filed: Sep. 18, 2000

(86) PCT No.: PCT/JP00/06341

§ 371 (c)(1),
(2), (4) Date: Mar. 18, 2002

(87) PCT Pub. No.: WO01/22391

PCT Pub. Date: Mar. 29, 2001

(30) Foreign Application Priority Data

Sep. 17, 1999 (JP) .......................................... 11-262968
May 29, 2000 (JP) ....................................... 2000-157757

(51) Int. Cl.$^7$ ................................................ G09G 5/00
(52) U.S. Cl. ..................... 345/589; 345/204; 345/44; 345/690; 348/678
(58) Field of Search ..................... 345/102, 204–207, 345/87, 10–11, 210, 19–21, 697, 699, 44, 47, 49, 51, 62, 75.2, 82–83, 589, 690; 348/68–69, 70–71, 377, 582, 609, 615, 678, 677

(56) References Cited

U.S. PATENT DOCUMENTS

| | | | | |
|---|---|---|---|---|
| 4,659,183 A | | 4/1987 | Suzawa ...................... 350/345 |
| 5,517,333 A | * | 5/1996 | Tamura et al. .............. 358/518 |
| 5,745,201 A | * | 4/1998 | Kawai et al. ............... 349/110 |
| 5,757,343 A | * | 5/1998 | Nagakubo .................... 345/63 |
| 6,208,327 B1 | * | 3/2001 | Ho et al. ..................... 345/690 |
| 6,271,825 B1 | * | 8/2001 | Greene et al. .............. 345/694 |
| 6,445,365 B1 | * | 9/2002 | Taniguchi et al. ............. 345/9 |

FOREIGN PATENT DOCUMENTS

| | | |
|---|---|---|
| JP | 50-157013 | 12/1975 |
| JP | 57-13478 | 1/1982 |
| JP | 61-120581 | 6/1986 |
| JP | 63-20680 | 2/1988 |
| JP | 401318966 A * | 12/1989 ........... G01R/13/20 |
| JP | 03-005725 | 1/1991 |
| JP | 03-051889 | 3/1991 |
| JP | 03-062796 | 3/1991 |
| JP | 06-161371 | 6/1994 |
| JP | 06-282241 | 10/1994 |
| JP | 08-015701 | 1/1996 |
| JP | 08-101660 | 4/1996 |
| JP | 09-101761 | 4/1997 |
| JP | 10-207416 | 8/1998 |
| JP | 11-095735 | 4/1999 |
| JP | 11-109927 | 4/1999 |

* cited by examiner

Primary Examiner—Matthew C. Bella
Assistant Examiner—Wesner Sajous
(74) Attorney, Agent, or Firm—Parkhurst & Wendel, L.L.P.

(57) ABSTRACT

In a display device according to a first aspect of the invention, luminance is not made substantially uniform over the entire display screen but rather imparted a luminance gradient such that luminance substantially monotonously decreases from the center of the screen towards the peripheral portion using a luminance gradient forming means, whereby power consumption is reduced compared to cases in which the entire screen shows substantially uniform luminance. In a second aspect of the invention, by optimizing gray level characteristics and thereby improving a viewer's impression of brightness, luminance gradient is made even less perceivable without increasing power consumption. These configurations provide large screen, low power consumption display devices.

43 Claims, 34 Drawing Sheets $$r = \text{rect}(1/(h \cdot a(x\cos\theta - y\sin\theta)), 1/(n \cdot b(x\sin\theta - y\cos\theta)))$$

FIG. 22

First Lookup Table

| Position r | Gain |
|---|---|
| 0 | 0 |
| 0.1 | 0.9 |
| ⌇ | ⌇ |
| 0.4 | 0.54 |
| ⌇ | ⌇ |

FIG. 23

Second Lookup Table

| Position | Luminance Level | Gain |
|---|---|---|
| 0.1 | ⋮ | ⋮ |
| ⟨ | ⟨ | |
| 0.2 | ⋮ | ⋮ |
| ⟨ | ⟨ | |

Signal Level 100% across Entire Screen

Luminance Signal

Gain 2

Result of Multiplying

Gain 1

Final Output

Prior Art can exhibit the same result

Signal Level 50% across Entire Screen

Luminance Signal

Gain 2

Result of Multiplying

Gain 1

Final Output

Signal Level 50% + 100%
FIG. 27A Luminance Signal
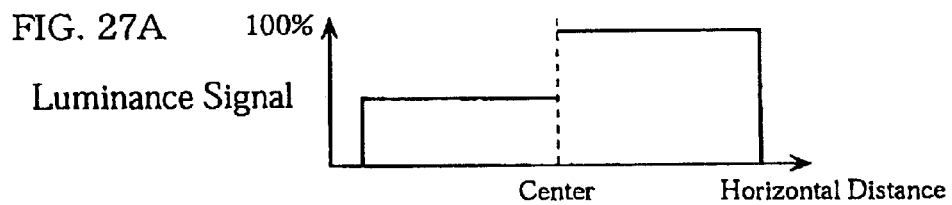
FIG. 27B Gain 2
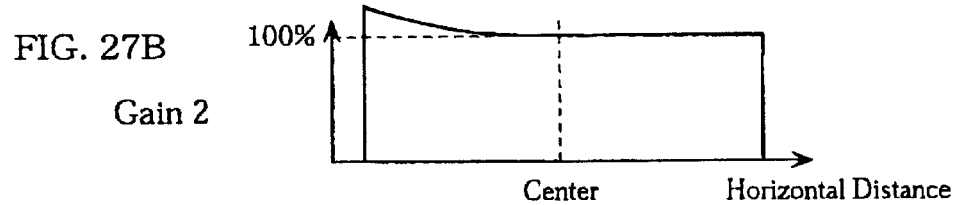
FIG. 27C Result of Multiplying
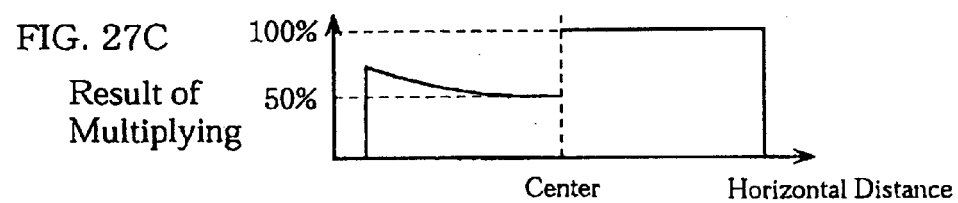
FIG. 27D Gain 1
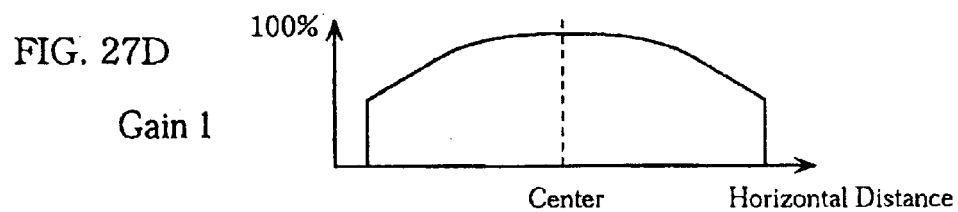
FIG. 27E Final Output
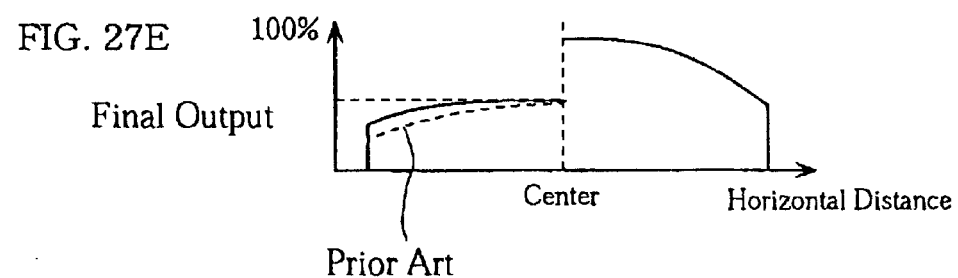
Prior Art

FIG. 29

Ambient Light Level (cd/m²)

| Luminance Level | Gain |
|---|---|
| ⋮ | ⋮ |

0~1

| | |
|---|---|
| ⋮ | ⋮ |

1~10

| | |
|---|---|
| ⋮ | ⋮ |

10~100

| | |
|---|---|
| ⋮ | ⋮ |

1

IMAGE DISPLAY DEVICE

TECHNICAL FIELD

The present invention relates to an image display device.

BACKGROUND ART

Image display devices are generally categorized into two types—non-emissive type and emissive type. Non-emissive type devices have an external light source means and employ a display element which modulates the light from the light source means in order to display images. Examples include liquid crystal monitors, liquid crystal projectors, and the like. Emissive type devices do not have an external light source means but the display element itself emits light to display images. For example, CRTs, PDPs, FEDs, organic ELs, and the like fall under this type.

For these conventional image display devices, high luminance, high contrast, high resolution, and lower power consumption have been desired to improve the picture quality. Of these, luminance has the greatest influence on the viewer's perception of images and therefore is the most important parameter.

In view of this, various attempts have been made in the past to make luminance uniform over the display screen. Such attempts include, for example, in the case of non-emissive type devices, using the characteristics of the light source means, and in the case of the emissive type devices, varying video signal in an appropriate manner, in order to achieve more uniform display screen luminance.

Taking a liquid crystal display device as an example, a conventional technique for making the luminance uniform within the screen is discussed below. The liquid crystal display device comprises, as shown in FIG. 32, a liquid crystal display element 1901, a backlight 1902, and a driving means 1903 for the liquid crystal display element 1901. The backlight 1902 comprises at least a light source 1904, a transparent light guiding plate 1905 for supplying light from the light source to the liquid crystal display element 1901, and a reflective cover 1906 for covering the light source. ON the back surface of the light guiding plate, a plurality of scattering microdots 1907 are formed numerously so that the luminance within the plane is controlled by the shapes and positions of the formed scattering microdots 1907.

The light discharged from the light source 1904 enters from an end face of the light guiding plate 1905 and is transmitted inside the light guiding plate, repeating the total reflection. All or part of the light which has entered the scattering microdots 1907 changes traveling direction, and the light which is incident on the upper surface of the light guiding plate at an angel smaller than a critical angle is discharged as output light, entering the liquid crystal display element 1901.

Accordingly, the distribution of scattering microdots on the back surface determines the luminance distribution in the screen; the conventional backlight 1902 has such a configuration that the areas of the dots are made greater from the peripheral portion of the screen towards the center portion and thereby the distribution of screen luminance is made 80% or greater such that uniform brightness is achieved.

For example, let us assume a case where light sources are horizontally disposed at end faces of the light guiding plate, the end faces being at the top and bottom of the screen. It has been known that, supposing the areas of the scattering microdots on the back surface are uniform over the entire screen, the luminance distribution is mostly formed in a vertical direction (along the y axis), resulting in a distribution in which a region including the center is dark, as shown in FIG. 33. This is due to the fact that a large portion of the light is scattered in portions of the light guiding plate which are near the light source and is discharged therefrom.

In order to compensate such a luminance distribution, it has been suggested that the areas of the scattering microdots be varied such as to be proportional to the reciprocal of the luminance distribution obtained in the case when the areas of the scattering microdots are uniform over the entire area of the display screen. That is, the areas of the scattering microdots are varied in the vertical direction in the screen so that the scattering microdots nearer to the center have larger areas. Thereby, uniformity of the luminance within the screen can be increased to as high as 80% or higher.

Next, a case of an emissive type display is described as an example. In a emissive type, it has been suggested that non-uniformity in the display element itself be corrected. Specifically, in order to compensate the luminance variation between the pixels, luminance variation is compensated in each pixel by only the varied value.

Generally, a driving means of a display device comprises a video signal decoding means 2101, a signal correcting means 2102, and a display element interface means 2103. The video signal decoding means 2102 serves the purpose of producing RGB color signals and horizontal and vertical synchronizing signals from ordinary NTSC signals.

The signal correcting means 2102 corrects each signal of R, G, and B and, essentially, corrects gray level characteristics in consideration of input-output characteristics of a display element 2104. The display element interface means 2103 serves the purpose of adjusting the corrected signal to match a signal level of the display element.

The signal correcting means 2102 is provided primarily for the purpose of achieving good gray level characteristics; however, when the image display means 2104 has some factors leading to luminance variation, it additionally comprises a means for correcting luminance variation. For example, there are cases where luminance variation between pixels, for example, is caused by inaccuracy in the production of display elements. In such cases, to make luminance in the screen uniform, gray level characteristics is varied for each pixel so that the luminance is made uniform at a certain level. More specifically, the signal correcting means comprises, in the form of an integrated memory, a lookup table which defines a gray level characteristic for each of the pixels, and a table lookup is performed synchronized with the synchronizing signals, so that luminance is appropriately modulated.

As described above, in prior art display devices, various attempts have been made to make brightness uniform in the display screen.

In recent years, display screen sizes have been increased, and even for home use TVs, 20-inch or larger screens have been desired. However, conventional display devices have drawbacks in that power consumption considerably increases as screen sizes increase. When a given luminance is required, the amount of power consumed increases in proportion to the area. Moreover, when a higher resolution is required as display size increases, the area per each pixel becomes smaller and therefore efficiency generally reduces. For this reason, when larger screen sizes and higher resolutions are desired without changing the luminance, the amount of power consumed increases even further.

Thus, if the luminance in the display screen is kept uniform, an increase in power consumption is inevitable. In addition, simply reducing luminance may make it possible to suppress an increase in power consumption, but the image will appear dark to the viewer of the image.

DISCLOSURE OF THE INVENTION

It is therefore an object of a first aspect of the present invention to provide a display device which is capable of reducing power consumption while displaying images that can create the viewer impression of bright images. More specifically, in order to solve the foregoing and other problems, there is provided in accordance with the first aspect of the present invention a display device in which the luminance is gradually decreased from the center of the display screen towards the peripheral portion, and by making the luminance gradient less perceivable utilizing a certain type of optical illusion, a reduction in power consumption is achieved without impairing viewer perception of a bright image.

It is an object of a second aspect of the present invention to make brightness distribution in the display screen less perceivable by utilizing a certain type of psychological illusion, even when the luminance in the peripheral portion is decreased.

In order to solve the foregoing and other problems, the present invention provides, according to the first aspect of the invention, a display device comprising at least an image display means and a luminance gradient forming means for forming a luminance gradient, wherein the luminance gradient forming means is such that, when displaying a full-white signal, a luminance of the image display means substantially monotonously decreases from substantially the center of a display screen of the image display means towards a peripheral portion thereof. The term "monotonously" is understood to mean "continuously."

Specifically, a display device according to the first aspect of the invention does not have substantially a uniform luminance over the entire display screen but is imparted with a luminance gradient which substantially monotonously decreases from the center of the screen toward the peripheral portion, and thereby, the power consumption is reduced in comparison with cases where the luminance is made substantially uniform over the entire screen.

In this configuration, it is preferable that, in order to make the luminance gradient less perceivable for a viewer, the luminance of a display image be substantially monotonously decreased. When this is the case, it is more preferable that the luminance is monotonously decreased from the center of the display screen in a horizontal or vertical direction since luminance gradients having symmetry are even less noticeable. For similar reasons, it is preferable that the luminance gradient be substantially symmetrical with respect to a vertical axis through substantially the center of the display screen or a horizontal axis through substantially the center of the display screen.

From these viewpoints, it is considered that there are several preferable examples of distribution profile of luminance gradient. For example, when the luminance gradient is distributed so as to be a concentric circle-like profile, the luminance gradient is very difficult to perceive. The term "a concentric circle-like luminance distribution" is intended to mean a distribution such that the lines connecting the points having approximately the same luminance form substantially circular shapes centered on substantially the center of the display screen. Luminance distribution profiles are defined in a like manner throughout herein.

The above-described configurations makes the luminance distribution less noticeable for the following reasons. Since human pupils are circular, the region that a human is capable of perceiving at one time has a near circle shape. Consequently, when a luminance gradient distribution profile in the display screen is circular, the region that a human is capable of perceiving at one time and the distribution profile of the luminance gradient are approximately similar in shape, and for this reason, psychological effect of the luminance gradient becomes small due to a kind of optical illusion. The luminance distribution profiles need not be substantially circle-like profiles and similar effects are obtained with ellipse-like profiles and rhombus-like profiles, so it is also preferable to form these luminance distribution profiles.

In the cases of ellipse-like luminance gradients, the ratio of the major axis and the minor axis may be made substantially equal to the ratio of the horizontal length and the vertical length of the image display screen to make the luminance gradients less noticeable. As a consequence, the shape of appearance of the display image and the distribution profile of the luminance gradient are nearly similar in shape, and therefore, psychological effect of the luminance gradient becomes small due to a kind of optical illusion. For similar reasons, a rectangle-like luminance distribution is also one of the examples of preferable luminance distributions.

Such luminance gradient may be defined by mathematical functions. Now, let us consider a luminance gradient function $f(x,y)$ which is substantially equal to a luminance B at a point in the display screen which has a distance x from the origin in the horizontal direction and a distance y in the vertical direction, the origin being substantially the center of the display screen. Here, when the luminance gradient function $f(x,y)$ is expressed with a luminance distribution profile function $r(x,y)$ as $f(x,y)=f(r)$, luminance gradient can be expressed in a simpler manner.

Since luminance gradient is less noticeable as the slope of luminance gradient becomes more gentle, it is preferable that the luminance gradient function $f(r)$ be monotonously decreased with respect to the variable r of the luminance distribution profile function. One example is a case of a linearly decreasing luminance gradient. Another example is that of a luminance gradient that decreases in an exponential function-like manner with respect to r.

This configuration is even more preferable because the slope of the luminance gradient is small in the vicinity of the center of the display screen but becomes larger towards the outward portion, whereby luminance gradient is even less perceivable, compared to the case where a luminance linearly decreases. This is due to the fact that when a human observes an image, he or she usually has a tendency to gaze mainly at the center of the display screen. That is, the luminance gradient in the portion at which a viewer focuses is small while the luminance gradient in the peripheral portion of the display screen, which is not intensely viewed, is large and therefore, the luminance gradient in the display screen is made less perceivable. For similar reasons, a luminance gradient in which the luminance decreases according to powers of r and a luminance gradient that sinusoidally and monotonously decreases towards the peripheral portion are also preferable.

It is preferable that the degree of luminance gradient image viewers can tolerate (how low the luminance in the peripheral portion can be made) be determined so as to conform to the results of human-engineering-based subjective assessments. In other words, it is preferable that a luminance gradient in a display screen match with a variety of threshold values defined according to the results of subjective assessments. These results are generally referred to as detection limit, permissible limit, and tolerable limit (limit for practical use).

According to the results of the subjective assessment experiments carried out by the present inventors, the threshold luminance values which are defined by the ratio of the luminance at the boundary of the display screen region having a screen diagonal ratio of 0.9 to the luminance of the center portion when a full-white signal is displayed are 55% ±15% for the detection limit, 30%±10% for the permissible limit, and 15%±5% for the tolerable limit (limit for practical use). Thus, it is preferable that luminance gradients be determined so as to satisfy the above conditions.

When a luminance gradient satisfies the condition of the detection limit, (the luminance at the boundary of the display screen region having a screen diagonal ratio of 0.9 is about 55% of that of the center of the display screen), 50% of the viewers do not perceive the luminance gradient. When a luminance gradient satisfies the condition of the permissible limit, the luminance gradient is permissible for 50% of the viewers and power consumption is further reduced compared to the case where the condition of the detection limit is satisfied. Likewise, when the condition of the tolerable limit is satisfied, power consumption is reduced even further.

This technique of reducing power consumption by forming a luminance gradient in the display screen using a luminance gradient forming means can be applied to any display devices that comprise a non-emissive or emissive type image display means. In the cases of display devices having a non-emissive image display means, it is possible that a light source means that provides light to the non-emissive image display means be provided with a luminance gradient forming means. For example, a display device using a transmissive liquid crystal panel as the non-emissive image display means has a light source and a light guiding plate as the light source means. By using a distribution of scattering dots formed on the back surface of the light guiding plate, a desired luminance distribution can be formed.

Either of non-emissive display means and emissive display means is capable of forming a desired luminance gradient by modulating input signals with a luminance gradient forming means. In this configuration, the luminance gradient forming means may comprise a lookup table that determines a gray level characteristic for each pixel, whereby the luminance distribution in the display screen is formed into a desired profile.

Likewise, it is possible to employ a configuration in which the luminance gradient forming means for varying the gains of the level shifter may be provided in the interface portion with the display element.

When the image display means is an FED, a desired luminance gradient can be formed in the display screen by providing an extraction voltage varying means as the luminance gradient forming means.

A display device according to a second aspect of the present invention comprises at least a luminance gradient forming means and an image display means, wherein brightness index defined by Eq. (1) substantially monotonously decreases from substantially the center of the display screen towards the peripheral portion thereof.

Eq. (1) has been established from the subjective assessment experiments carried out by the present inventors and is a criterion that shows a good correlation with psychological impression concerning brightness.

As discussed in the section describing the first aspect of the invention, that a luminance monotonously decreases from the center of the display screen towards the peripheral portion means that a brightness index also monotonously decreases. This configuration is, as discussed in the section describing the first aspect of the invention, effective for reducing power consumption. However, because the brightness index simultaneously decreases, psychological impression concerning brightness degrades according to the equations. In view of this, in the first aspect of the invention, the profile of luminance gradient is controlled or the slope of luminance gradient is monotonously decreased in order to make luminance gradient less perceivable as luminance unevenness.

On the other hand, in the second aspect of the invention, brightness index that decrease according to the equations are improved in order to improve viewer's impression on brightness. Specifically, it is an object of the second aspect of the invention that degradation in the viewer's impression of brightness due to decrease in luminance is improved by optimizing gray level characteristics, whereby luminance gradient is made even less perceivable. This configuration merely varies gray level characteristics, so basically, power consumption does not increase.

In this configuration, brightness index may be compensated so as to be substantially uniform over the entire display screen area, whereby the luminance in the peripheral portion is reduced without degrading the viewer's impression of brightness.

As well as compensating brightness index so as to be substantially uniform over the entire display screen area, it is also possible that brightness index may be compensated within the region having a screen diagonal ratio of 0.5, for example. The reason is that when a human observes an image, the point at which he or she focuses on most is in the vicinity of the center portion of the display screen and the area that he or she can observe at one time is substantially within the region having a screen diagonal ratio of 0.5. Thus, by optimizing gray level characteristics in the display screen and thereby improving the distribution of brightness index, power consumption can be reduced without adversely affecting viewer's impression of brightness.

It is also preferable that the distribution profile of brightness index in the display screen be corrected. When the preferable luminance profile as described above is not attained due to individual differences of display elements, for example, it is possible to make luminance gradient less perceivable by making brightness index have a desirable distribution profile using a brightness index improving means, that is to say, by forming a distribution profile having high degree of symmetry as described above.

In a similar manner, even when the actual luminance slope is shifted from a desired luminance slope, it is possible to make luminance gradient even less perceivable by matching brightness index with the desired luminance slope.

Additionally, it is possible to make less perceivable luminance unevenness in the display screen which is often a problem in a liquid crystal display element having a direct type backlight. As for a direct type backlight, which has a configuration such that several light sources are provided directly beneath a liquid crystal display element, the portions directly above the lamps are bright while the portions between the lamps are dark.

It is possible, however, to ameliorate picture quality degradation due to such luminance distribution, because the brightness index improving means according to the second aspect of the invention is capable of making brightness index uniform in the display screen by appropriately adjusting gray level characteristics so that reduction in luminance is compensated.

BRIEF DESCRIPTION OF THE DRAWINGS

FIG. 22 a schematic view of the state of stored data in a first lookup table.

FIG. 22 a schematic view of the state of stored data in a second lookup table.

FIGS. 27($a$) to 27($e$) illustrate a signal conversion process in the case when the first half of the signal levels for a scanning line is 50 % luminance and the second half is 100% luminance.

FIG. 29 is a schematic view of the state of stored data in a third lookup table.

BEST MODE FOR CARRYING OUT THE INVENTION

EMBODIMENT 1

Figure 1:
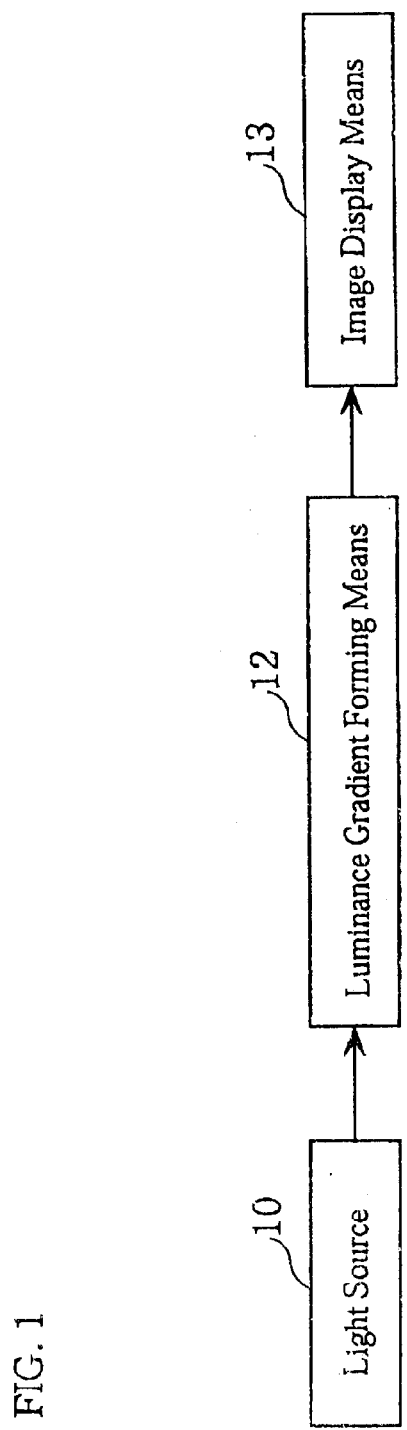
FIG. 1 is a block diagram of a display device constructed according to Embodiment 1 of the present invention.

FIG. 1 shows a block diagram for illustrating a display device constructed according to one embodiment of the present invention, the display device employing a non-emissive type image display means. Output light beams emanated from a light source 10 are subject to a luminance gradient forming means 12, which forms a luminance gradient that, for example, substantially monotonously decreases from the center portion of the display screen towards the peripheral portion, and then are supplied to an image display means 13. The term "monotonously" is understood to mean "continuously." The image display means 13 modulates the supplied images in order to images. By employing this configuration, a gradient such as described above (luminance distribution) is formed in the luminance in the case when a full-white signal is displayed. In this section, a more detailed discussion will be provided on a case in which a transmissive liquid crystal panel is used as the image display means.

Figure 2:
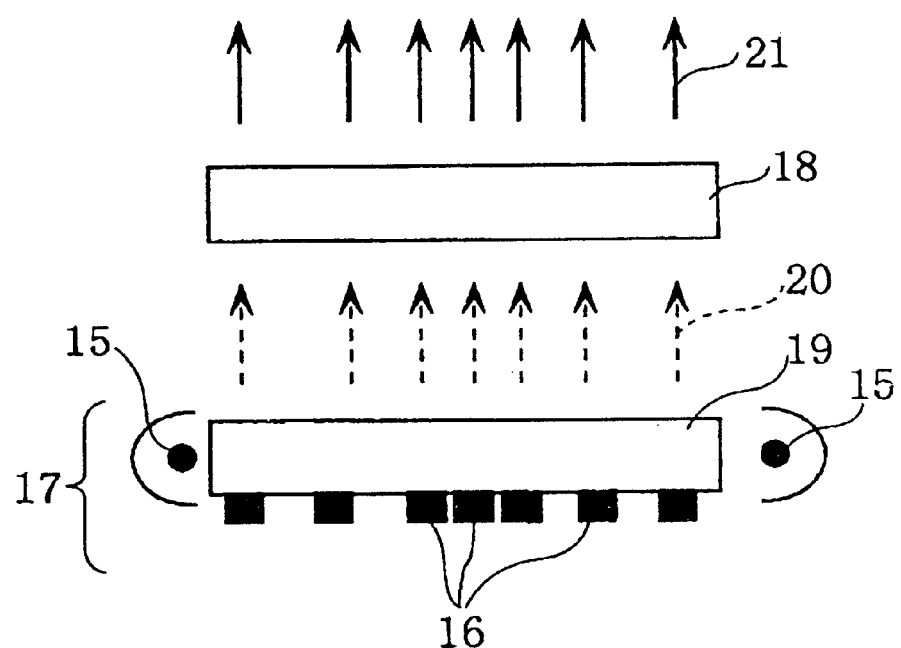
FIG. 2 shows the configuration of the display device constructed according to Embodiment 1 of the present invention.

FIG. 2 shows the construction of a display device according to the present invention, which employs a liquid crystal panel as an image display means. Examples of the display device include liquid crystal monitors, liquid crystal projectors, and the like. The display device basically comprises a light source 15, a backlight 17 also comprising scattering microdots 16, and a transmissive type liquid crystal panel 18 serving as an image display means. The light beams from the light source 15 enter from an end face of a transparent light guiding plate 19 and are transmitted between the upper and lower surfaces, repeating the total reflection.

The back surface of the transparent light guiding plate 19 has a plurality of scattering microdots 16 disposed thereon. All or part of the light incident on the portions where the scattering microdots 16 have been formed changes traveling direction, and the light that is incident on the upper surface of the transparent light guiding plate 19 at an angle smaller than a critical angle (light rays 20 in the figure) exits therefrom and enters the transmissive type liquid crystal panel 18. The output light 20 enters the transmissive type liquid crystal panel 205 and is converted into a display image formed of display light 21.

The scattering microdots 16 may be formed on the back surface of the transparent light guiding plate 19 by screen printing a medium in which microparticles of silicon oxide or titanium oxide are dispersed. Alternatively, they may be realized by forming protrusions on the back surface by injection molding.

By adjusting the areas and positions of the scattering microdots 16 formed on the back surface of the light guiding plate 19, the amount of the light in the periphery is condensed into the center portion of the display image to form a desired luminance gradient.

Figure 3:
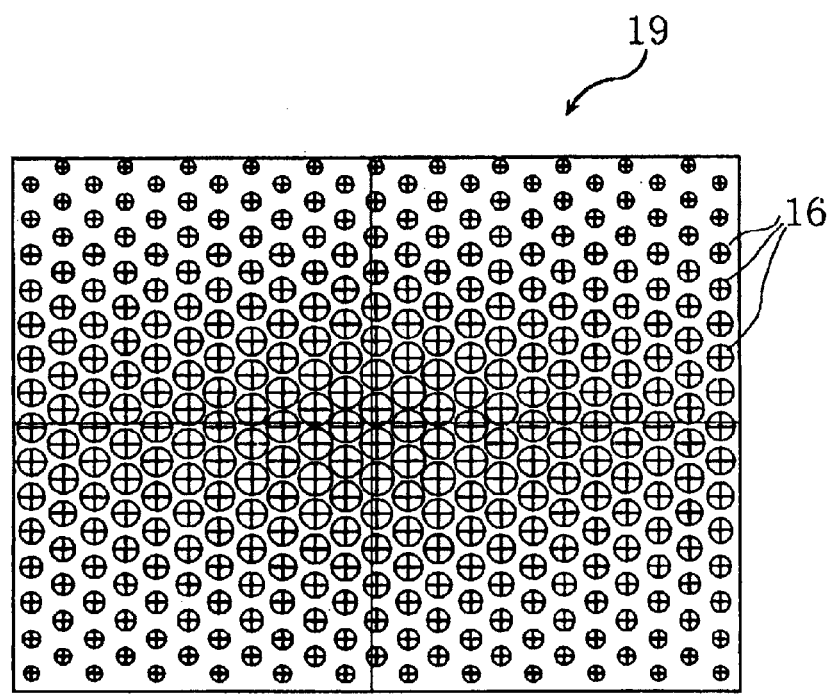
FIG. 3 is a plan view showing luminance gradient forming means in the display device constructed according to Embodiment 1 of the present invention.

FIG. 3 shows a plan view of the scattering microdots 16 formed on a transparent light guiding plate. As seen in the figure, the areas of the scattering microdots 16 are varied so as to form a luminance gradient such that luminance monotonously decreases from the center portion of the display screen towards the peripheral portion. Thus, of the constituent components of the backlight 17, a set of scattering microdots 16 having a distribution as shown in FIG. 3 corresponds to the luminance gradient forming means 12 of the present invention.

Such a distribution of the scattering microdots 16 can be obtained by varying the radii of the scattering microdots 16 in proportion to the values obtained by dividing a desired luminance distribution by a screen luminance distribution that is formed in the case where the radii of scattering microdots 16 are uniform. Here, it is assumed that the luminance distribution formed in the case of the radii of the scattering microdots 16 being the same over the entire plane is defined by $\phi0(x,y)$, where the x axis is parallel to the horizontal direction of the screen, the y axis is parallel to the vertical direction of the screen, and the origin is the center of the screen.

Under this condition, when a desired luminance distribution to be achieved is defined as $f(x,y)$, the area $S(x,y)$ of a scattering micro-member is obtained by the following Equation (2):

$$S(x,y)=a \times f(x,y)/\phi0(x,y) \qquad \text{Eq. (2)}$$

In the above equation, a is a proportionality factor.

Next, luminance gradient function $f(x,y)$, which represents luminance distribution, will be detailed below. A luminance gradient should be formed, when a full-white signal is displayed, so as to substantially monotonously decrease in the horizontal direction and the vertical direction of the displayed image from substantially the center of the displayed image. When a luminance gradient is formed such that it is substantially symmetrical with respect to the horizontal direction or the vertical direction and substantially monotonously decreases from substantially the center of the display image, the viewer does not easily perceive the luminance distribution.

Such a luminance distribution can be easily defined by a luminance gradient function $f(x,y)=f(r)$ which represents the luminance of a point in the display screen which has a distance x from the origin along the horizontal direction and a distance y from the origin along the vertical direction, the origin being the center of the display image. It is noted that r represents a luminance distribution profile function, and accordingly, by defining the luminance distribution profile function r such that the luminance function $f(x,y)=f(r)$, the profile of screen luminance distribution (the shape of the line connecting the points having the same luminance in the screen) can be easily defined.

Figure 4:
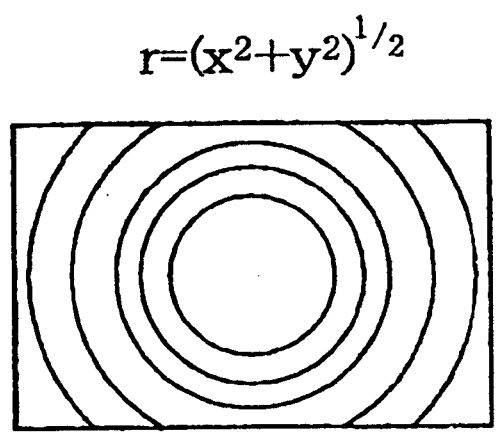
FIG. 4 is a diagram for illustrating a luminance distribution profile of the display device constructed according to Embodiment 1 of the present invention.

In the present embodiment, it is preferable that a concentric circle-like luminance distribution as shown in FIG. 4 be formed, for example. In this case, the concentric circle-like luminance gradient can be expressed by setting the luminance distribution profile function r to be $(x^2+y^2)^{(1/2)}$. The term "the concentric circle-like luminance gradient" is intended to indicate that the lines which connect the points having the same luminance form substantially circular shapes.

Figure 5:
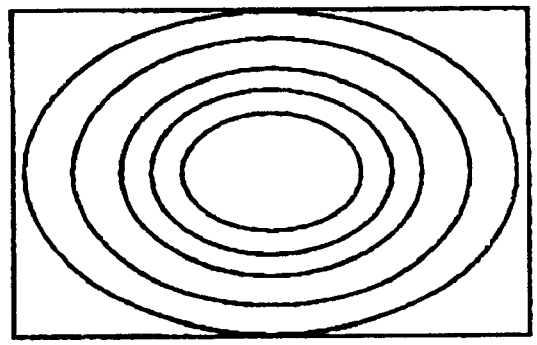
FIG. 5 is a diagram for illustrating a luminance distribution profile of the display device constructed according to Embodiment 1 of the present invention.

It is also preferable to form a luminance gradient which forms elliptic shapes such that the luminance decreases from the center towards the periphery as shown in FIG. 5. In this case, the luminance gradient can be expressed by setting the luminance profile function r to be $((x/a)^2+(y/b)^2)^{(1/2)}$ (where a and b are positive constants). The ratio of a and b may be made substantially equal to a common aspect ratio of the screen. For example, it may be made substantially equal to 4:3, 16:9, or 5:4.

Figure 6:
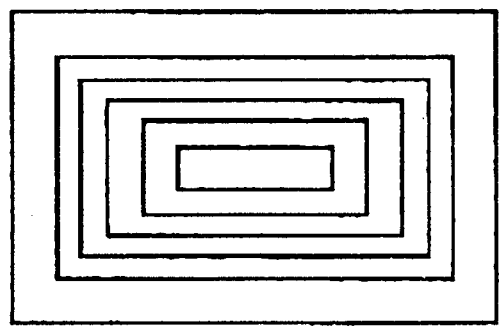
FIG. 6 is a diagram for illustrating a luminance distribution profile of the display device constructed according to Embodiment 1 of the present invention.
Figure 7:
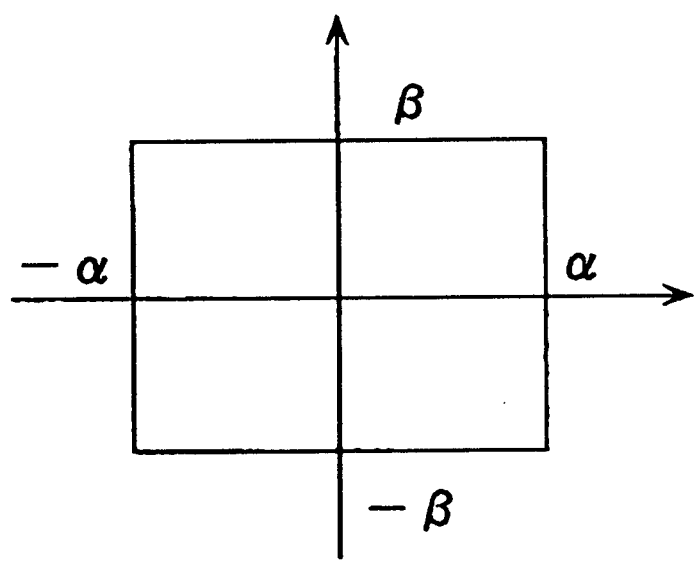
FIG. 7 is a diagram for illustrating a luminance distribution profile function which represents a luminance distribution profile of the display device constructed according to Embodiment 1 of the present invention.
Figure 8:
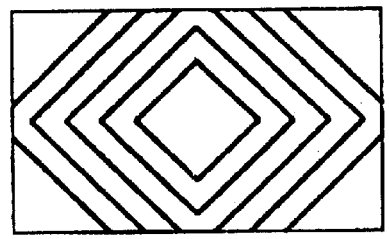
FIG. 8 is a diagram for illustrating a luminance distribution profile of the display device constructed according to Embodiment 1 of the present invention.

A luminance gradient as shown in FIG. 6 is also preferable. In this case, the luminance gradient can be expressed by making the luminance profile function r to be rect(x/(a×h), y/(b×v)), where a and b are positive constants, h is the horizontal length of the screen, v is the vertical length thereof, and rect($\alpha$, $\beta$) is a special function representing a rectangle as shown in FIG. 7 in which the ratio of the length and the width is $\alpha$:$\beta$ where $\alpha$:$\beta$ are defined as $0 \leq \alpha \leq 1$ and $0 \leq \beta \leq 1$. The ratio of a and b may be a common aspect ratio, as in the case of the ellipse.

Likewise, it is also preferable to form a rhombus-like luminance gradient. In this case, the luminance profile function can be expressed as r=rect(1/(h×a×(x×cos$\theta$−y×sin$\theta$)), 1/(v×b×(x×sin$\theta$+y×cos$\theta$))), where $\theta$=45°.

In addition, by setting the luminance distribution profile function to be r=x or r=y, the luminance gradient can be made symmetrical with respect to the horizontal axis through the center of the display screen or with respect to the vertical axis through the center of the display screen.

Next, the rate of change of luminance, i.e., luminance slope, is discussed. In the present invention, it is preferable that luminance substantially monotonously decrease. In other words, it is desirable that a luminance gradient be such that f(r) substantially monotonously decreases with respect to r, and, for example, luminance slopes that are represented by the following functions are preferable.

For example, when f(r)=−a×r+b (where a and b are positive constants), luminance linearly decreases with respect to r. Likewise, the functions represented as f(r)=a×exp(−b×r), f(r)=a×exp{−(r/b)²/2} and f(r) a×cos(2π/λ×b×r) are also capable of forming luminance gradients that monotonously decrease from the center portion of the screen towards the periphery. It is to be noted here that it is not necessary that luminance distribution profiles and luminance slopes exactly match the distributions and the slopes that are defined by the functions.

Next, taking a specific luminance distribution as an example, advantageous effects achieved by the present invention will be explained. In a display device constructed according to FIG. 2, a concentric circle-like luminance distribution profile is employed, and the scattering microdots, serving as the luminance gradient forming means, are formed so that the luminance slope substantially monotonously decreases from substantially the center of the screen according to the Gaussian Function. In this case, the scattering microdots are adjusted so that the luminance at the boundary of the display screen region having a screen diagonal ratio of 0.9 is 0.55 of that of the center.

This has been determined based on the subjective assessment, which will be described below. The present inventors have carried out human engineering-based subjective assessment experiment to investigate the proportion of image viewers who perceive luminance variation which continuously changes from the center portion of the display screen towards the peripheral portion. The method of the experiment was as follows: subjects were made to observe the images in which the luminance was varied from the center portion of the display screen towards the peripheral portion at various rates and were asked to evaluate unevenness of the luminance according to the double-stimulus impairment scale method, which is a known technique. Degrees of the unevenness were expressed by the ratio of the luminance at the boundary of the display screen region having a screen diagonal ratio of 0.9 and the luminance at the center portion of the screen.

The experiment was repeatedly performed with over 100 subjects, and consequently, the following three threshold luminances were found: detection limit luminance, permissible limit luminance, and tolerable limit luminance (limit for practical use). At detection limit luminance, 50% of the viewers do not notice a luminance gradient. At permissible limit luminance, 50% of the viewers notice the presence of a little luminance gradient but do not find it distracting. At tolerable limit luminance, 50% of the viewers find it a little distracting but tolerable.

From the results of the subjective assessment, the detection threshold luminance was determined to be 55%±15%, the permissible threshold luminance 30%±10%, and the tolerance threshold luminance 15%±5%.

Figure 9:
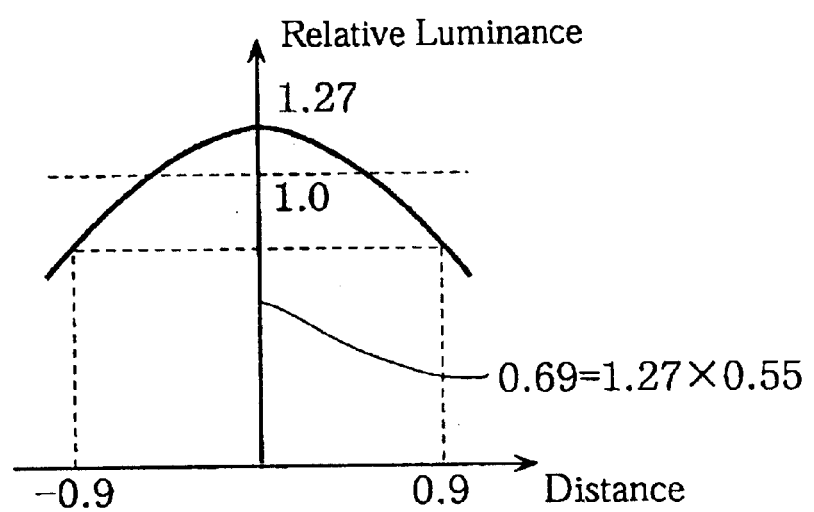
FIG. 9 is a diagram for illustrating luminance gradient of the display device constructed according to Embodiment 1 of the present invention.

Accordingly, in a display device of the present embodiment, the arrangement of scattering microdots was designed so that the luminance at the boundary of the display screen region having a screen diagonal ratio of 0.9 was 0.55 with respect to the luminance at the center of the display screen, as shown in FIG. 3. When employing this configuration, the luminance at the center of the display screen is higher by about 27% than a case where the luminance is designed to be uniform over the entire screen, as shown in FIG. 9, because the light that is to go out from the peripheral portion is condensed into the center portion. This means that, assuming the amount of power consumed is the same, the luminance is improved by 27% compared to conventional display devices, and on the other hand, assuming that the luminance at the center of the display screen is the same as that of conventional devices, it is possible to reduce the power consumption by 27%. Moreover, since the luminance monotonously and gradually decreases from the center portion of the display screen towards the peripheral portion, half of the observers do not notice the gradient.

Thus, according to the display device of the present invention, the power consumption is reduced by nearly 30% compared to conventional liquid crystal display devices, while the image observer does not perceive the luminance gradient.

It is of course possible to employ the permissible limit luminance or the tolerable limit luminance for the threshold luminance. In these cases, although the luminance gradient is slightly more easily perceived compared to the case of the detection limit, the power consumption can be even further reduced. Therefore, these are very effective when further power consumption is required.

EMBODIMENT 2

Figure 10:
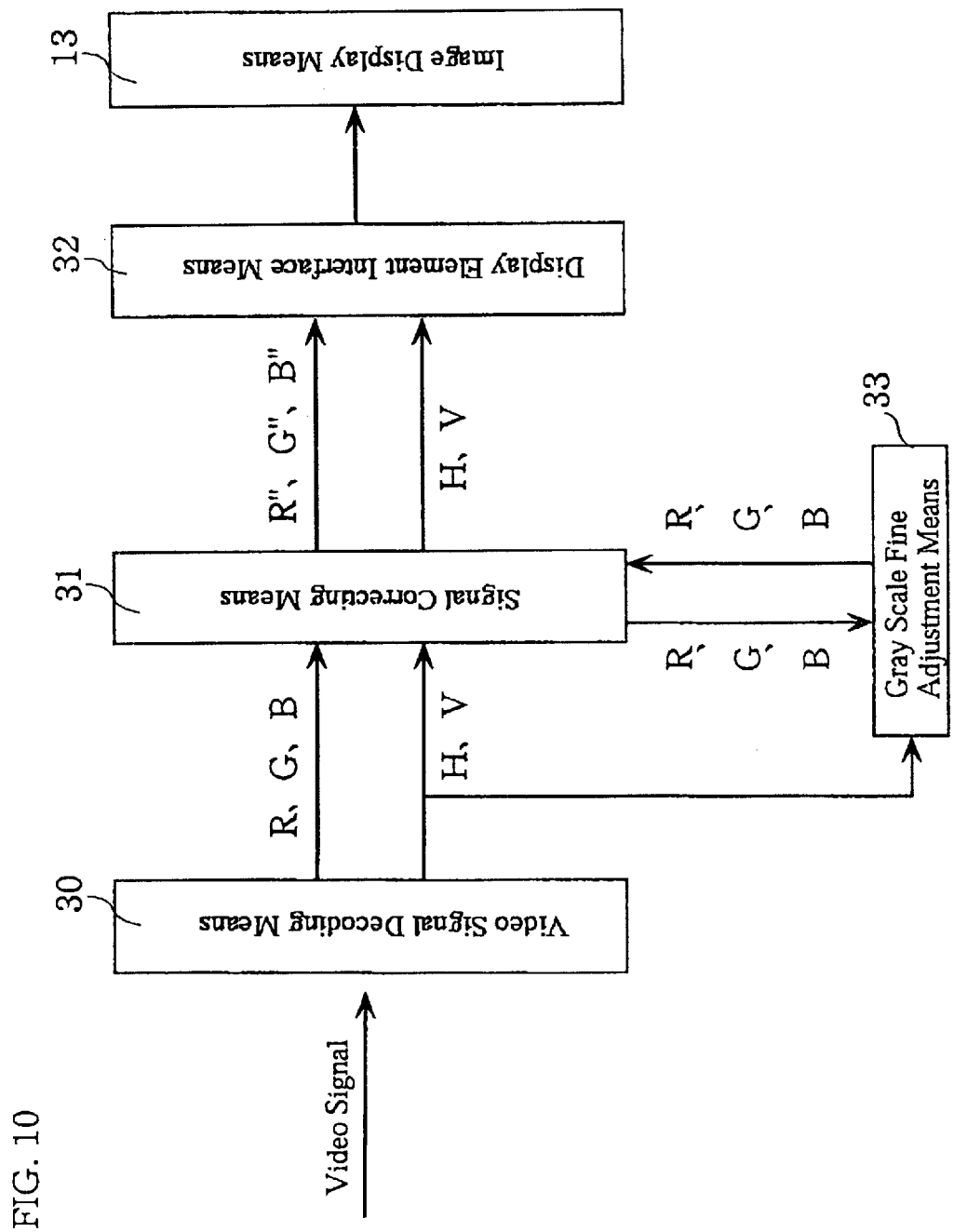
FIG. 10 is a block diagram of a display device constructed according to Embodiment 2 of the present invention.

FIG. 10 shows a block diagram of a display device constructed according to another embodiment of the present invention. A feature of the present Embodiment 2 is that input signal is directly controlled to form a luminance gradient. More specifically, while in the foregoing Embodiment 1, the luminance gradient is formed by controlling positions and areas of the scattering microdots formed, in the present Embodiment 2, the luminance gradient is formed by a signal conversion processing of video signals.

The present Embodiment 2 is applicable to both non-emissive type elements and emissive type elements. Examples of emissive type elements include CRTs, PDPs (plasma display panel), FEDs (field emission display: displays that utilize electrons discharged due to field effect for electron excitation light emission) ELs (displays which produce light emission using electroluminescence), and LED arrays in which LEDs are arranged two-dimensionally. In the display device constructed according to the present embodiment, it is only necessary that a luminance gradient means for forming a luminance gradient by directly controlling input signals be provided, and it is of course possible to employ non-emissive type image display devices.

In the display device of the present embodiment too, it is preferable that the luminance distribution having the luminance distribution profile and the luminance slope such as described in Embodiment 1 be realized. Specifically, it is preferable that the luminance substantially monotonously decrease from the center portion of the screen towards the peripheral portion, and it is desirable that the slope be substantially approximated by any of the functions described in Embodiment 1. In addition, the profile of the luminance distribution (the line connecting the points having the same luminance in the screen) is substantially symmetrical with respect to the horizontal and vertical axes, and is substantially the same as any one of concentric circles, ellipses, rectangles, and rhombuses.

In particular, when the luminance at the boundary of the display screen region having a screen diagonal ratio of 0.9 is set at the detection limit luminance as described in Embodiment 1, a luminance gradient that is difficult to be perceived is formed.

Next, the luminance gradient forming means is detailed below. As shown in FIG. 10, an ordinary video signal passes through a signal processing circuit which comprises a video signal decoding means 30, a signal correcting means 31, and an image device interface means 32, and then enters an image display means 13. The video signal decoding means 30 serves the purpose of converting ordinary NTSC signals to each RGB primary color signal and horizontal and vertical synchronizing signals.

The signal correcting means 31 serves the purpose of correcting each of the RGB signals and inherently corrects gray level characteristics taking into consideration the input-output characteristics of the display device. The display device interface means 32 serves the purpose of adjusting the corrected signal such as to match with the signal levels for the image display means 13.

The signal correcting means 31 of the present invention, more specifically, has a gray level characteristic adjusting means 33 for controlling the gray level characteristics for each pixel. The gray level characteristic adjusting means 33 has a memory and stores gray scale data for every pixel in the form of a lookup table, so as to modulate video signal in response to synchronizing signals. That is, the signal correcting means 31 and the gray scale adjusting means 33 correspond to the luminance gradient forming means 12.

Figure 11:
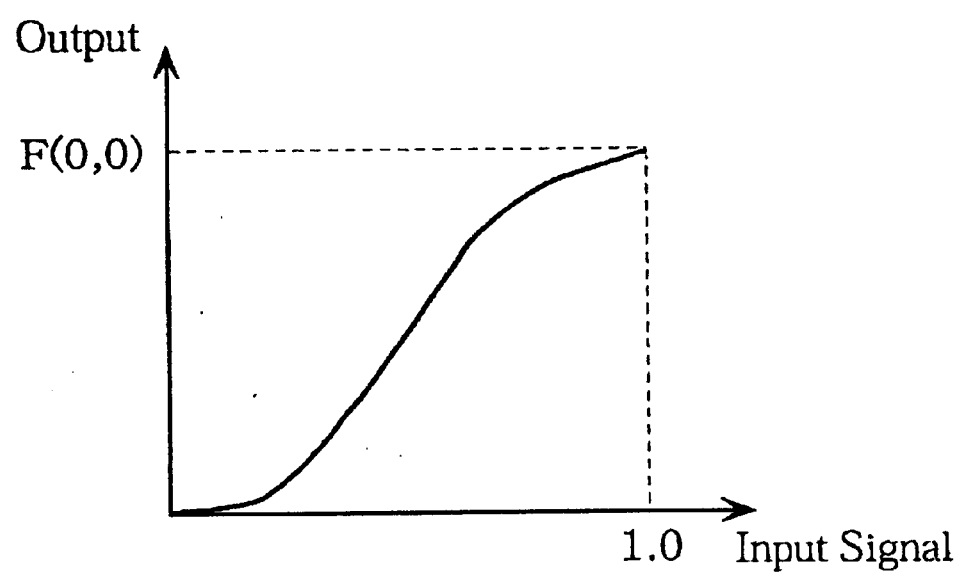
FIG. 11 is a graph illustrating the gray level characteristics in the center portion of the display device constructed according to Embodiment 2 of the present invention.
Figure 12:
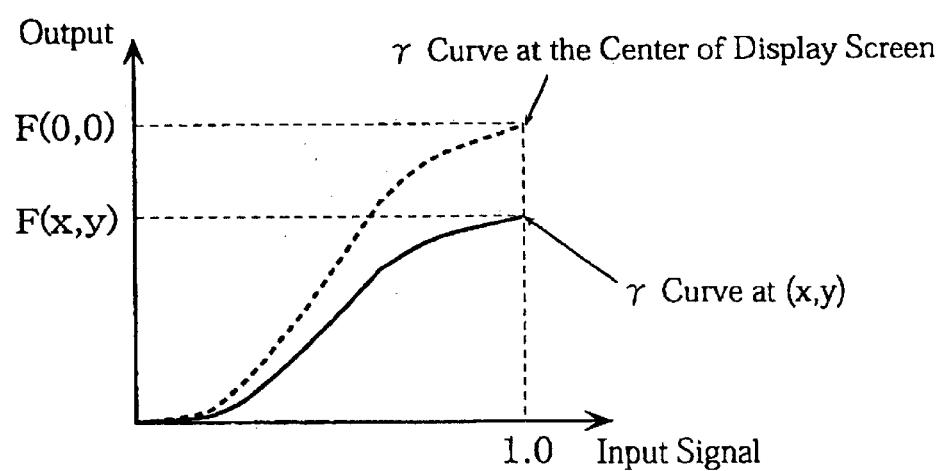
FIG. 12 is a graph illustrating gray level characteristics of the display device constructed according to Embodiment 2 of the present invention.

The luminance gradient forming means 12 controls gray level characteristics so that a desired luminance distribution profile such as described in Embodiment 1 can be obtained. Specifically, it is assumed that the luminance distribution in the display screen is substantially approximated by the luminance gradient function $f(x,y)=f(r)$. Here, for example, when the gray level characteristics at the center of the display screen is represented by the curve shown in FIG. 11, the gray level characteristic at a point whose luminance is represented by $f(x,y)$ shows the curve as shown in FIG. 12. More specifically, it is only necessary that the gray level characteristics of these points have similarity and that the ratio of approximately $f(x,y)/f(0,0)$.

Thus, by locally modulating input signals themselves, a desired luminance gradient can be freely formed in the display screen. Consequently, in the display device constructed according to the present embodiment as well, power consumption can be reduced by forming a luminance gradient which is not perceivable.

Figure 13:
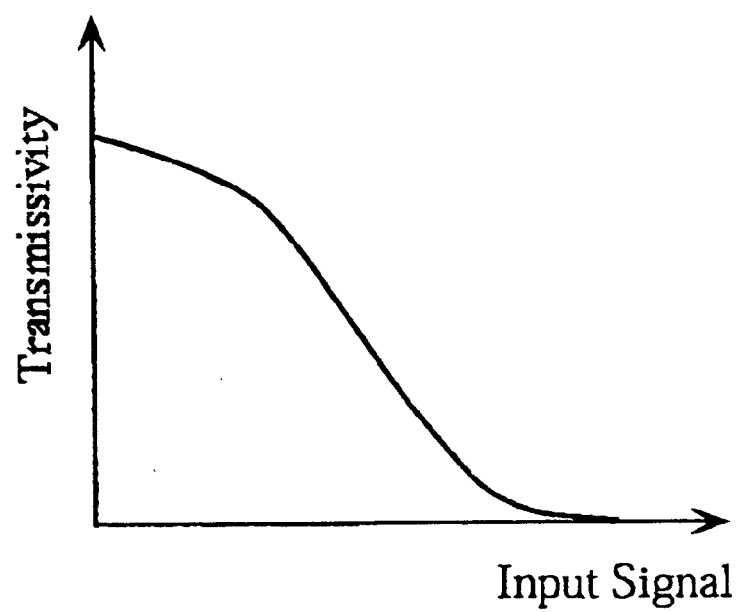
FIG. 13 is a graph illustrating input-output characteristics of an image display means used in the display device constructed according to Embodiment 2 of the present invention.

Alternatively, another configuration is possible in which the display element interface means 32 has the functions of the luminance gradient forming means. As an example, a case in which a liquid crystal display element is used as the image display means 13 is considered. A liquid crystal display element, when it is of normally-white mode, has input-output characteristics as shown in FIG. 13.

Accordingly, the display element interface means 32 inverses the signals supplied from the signal correcting means 31 so that a desired signal can be obtained. In this condition, when the display element interface means 32 varies the gain of a level shifter for each pixel, it is possible to obtain a similar luminance gradient to the case described above, in which gray level characteristics is varied for each pixel.

Figure 14:
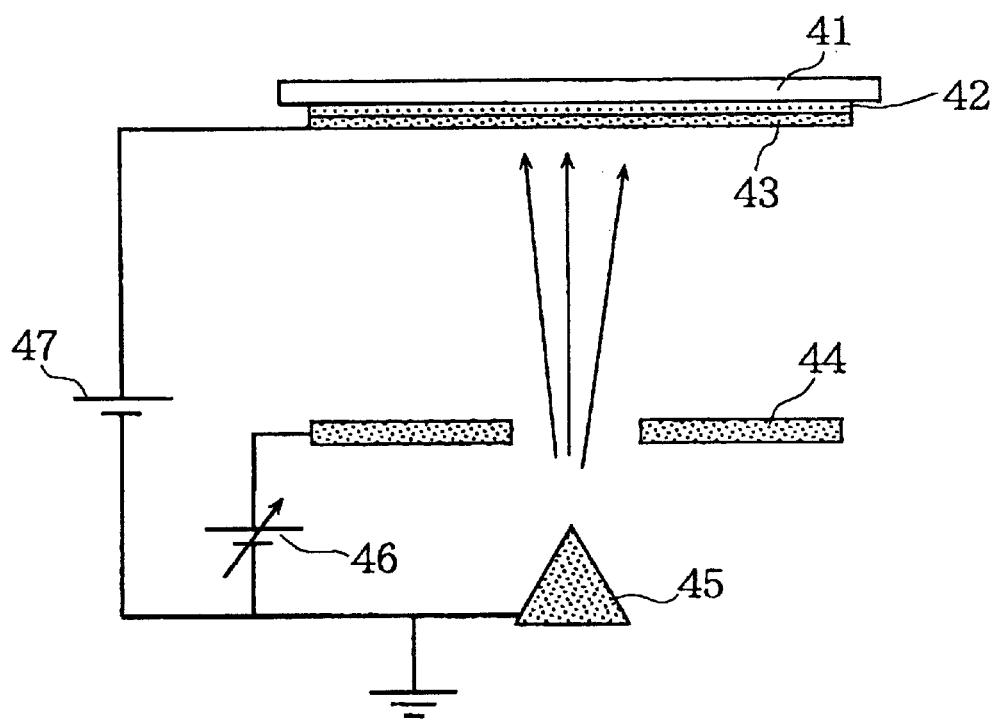
FIG. 14 is a diagram showing the configuration of a display device constructed according to Embodiment 2 of the present invention.

When an FED is employed for the display element, luminance gradient can be formed by, for example, using an extraction voltage varying means 40, as shown in FIG. 14. Specifically, the extraction voltage varying means 40 is provided such that it modulates extraction voltage in response to the signal from the display element interface means 32 so that a desired luminance gradient is obtained. Shown in FIG. 14 are a substrate 42, phosphors 42, an anode electrode 43, an extraction electrode 44, an electron gun 45, extraction voltage 46, and acceleration voltage 47.

Figure 15:
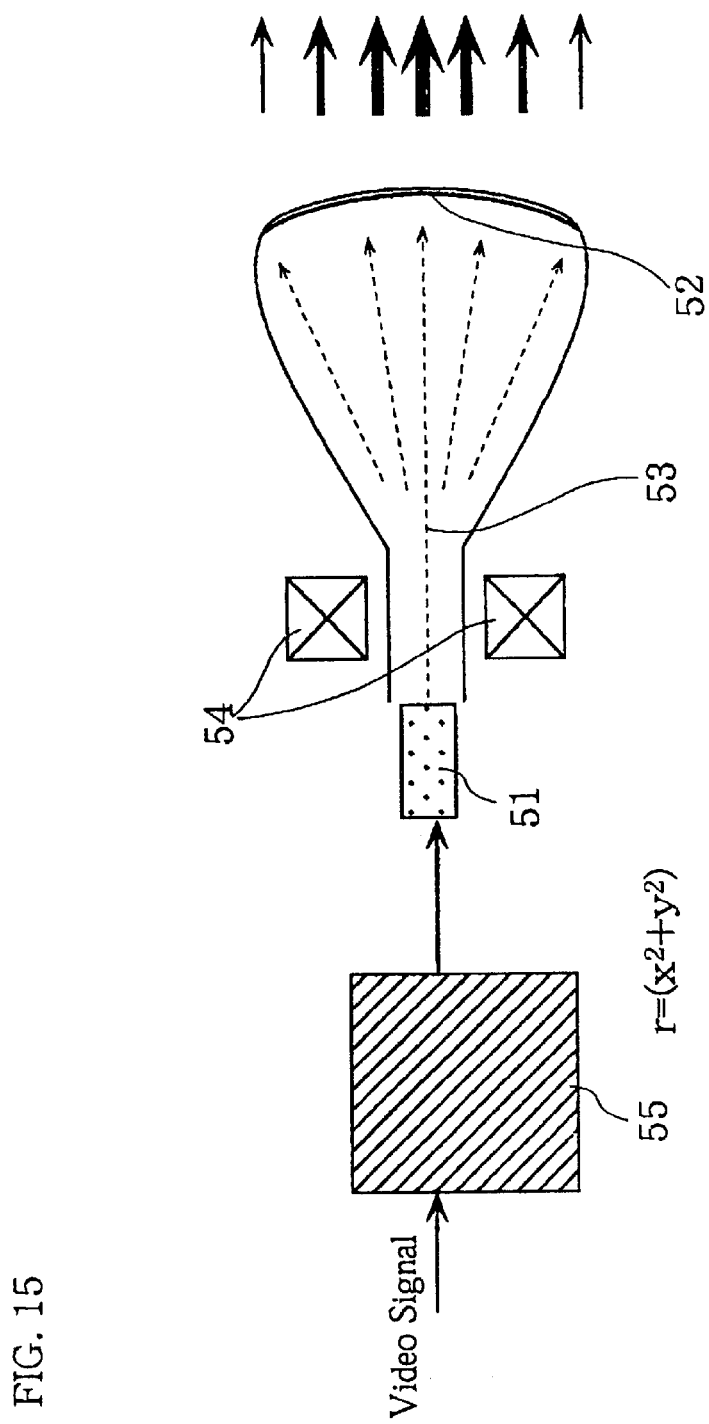
FIG. 15 is a diagram showing the configuration of another display device constructed according to Embodiment 2 of the present invention.
Figure 16:
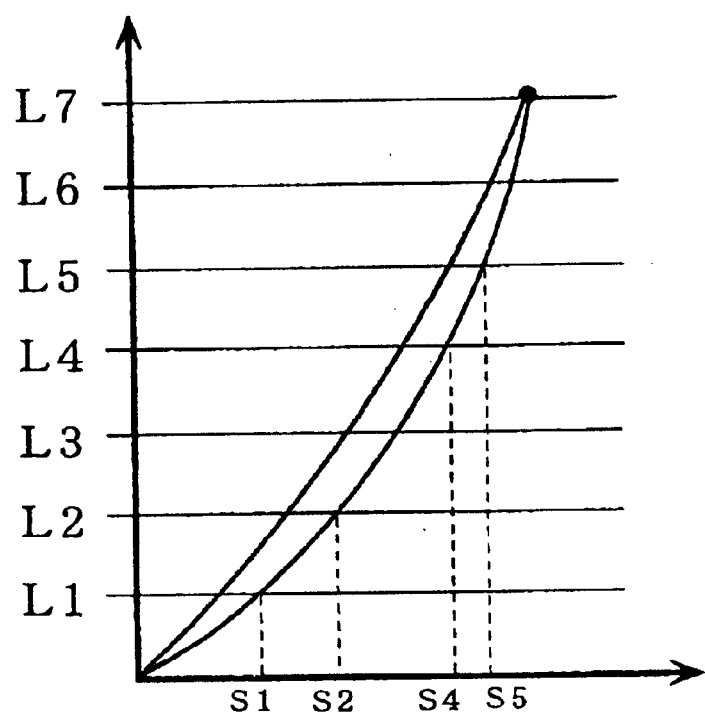
FIG. 16 is a graph for illustrating a method of calculating γM.

A specific configuration in which a CRT is employed for the image display means is shown in FIG. 15. That is, a case where an image display means performs image display by cathode ray scanning which causes the phosphors to emit light. Referring to FIG. 15, the specific configuration is as follows. The image display means primarily comprises an electron gun 51 and a phosphor screen 52, and electron beams 53 discharged from the electron gun 51 are deflected by a cathode ray deflecting device 54 and the phosphor screen 52 scanned. The luminance gradient forming means 55 modulates video signal so as to obtain the luminance distribution profile as described above and realizes a gradual luminance gradient from the center of the display screen towards the peripheral portion. In this kind of display device as well, it is preferable to achieve the luminance distribution profile and luminance slope as described in Embodiment 1. Specifically, it is preferable to achieve a luminance that substantially monotonously decreases from the center portion of the display screen towards the peripheral portion, and the slopes that are substantially approximated by the functions shown in Embodiment 1. It is also preferable that the profiles of the luminance distribution (lines that connect the points having the same luminance in a display screen) be approximately symmetrical with respect to substantially the horizontal and vertical axes and be substantially equal to concentric circles, ellipses, rectangles, and rhombuses. In particular, when the luminance at the boundary of the display screen region having a screen diagonal ratio of 0.9 is at the detection limit as described in Embodiment 1, it is possible to form a luminance gradient that is even less perceivable. It is also noted that in the present display device as well, the luminance gradients as explained in Embodiment 1 may be formed and the luminance at the boundary of the display screen region having a screen diagonal ratio of 0.9 may be set at threshold luminances, in order to display bright images without making viewers perceive luminance gradient. Further, by reducing the luminance in the peripheral portion, power consumption can be reduced without adversely affecting the viewer impression of brightness.

EMBODIMENT 3

Embodiments 1 and 2 have discussed examples in which the luminance slope is such that the luminance at the boundary of the display screen region having a screen diagonal ratio of 0.9 is approximately the detection limit luminance (about 55% luminance of the luminance of the center portion). This is a level at which the results of the subjective assessment show that 50% or more observers do not notice the unevenness in the brightness. Nevertheless, when further reduction in power consumption is desired, it is of course possible that, in the display devices described in Embodiments 1 to 3, the luminance slope is formed such that the luminance at the boundary of the display screen region having a screen diagonal ratio of 0.9 is reduced to the permissible limit luminance or the tolerable limit luminance (limit for practical use). In this case, the luminance slope is of course likely to be detected. For this reason, the present embodiment describes in detail an embodiment of a display device in which such a luminance slope is made even less detectable.

Luminance referred to in the present embodiment is a physical quantity which is directly measurable with the use of instruments and is an index showing brightness. However, it does not necessarily match the psychological impression of brightness held by the image viewers. In other words, even when luminances are the same, the psychological impression perceived by viewers varies depending on contrast and gray level characteristics.

Through subjective assessments, the present inventors have found Brightness Index BI [$cd/m^2$], which correlates very well to the psychological impression, and the brightness index and the measurable physical quantity have a correlation represented by the following Equation (3).

$$\begin{aligned}BI &= a \times L + b \times CR + d \times yM + g \\ &= a \times L + b \times L/(OFF+BG) + d \times yM + g \\ &= a \times L + b/(1/Cr + BG/L) + d \times yM + g\end{aligned} \quad \text{Eq. (3)}$$

In the equation above, L is a luminance when displaying a full-white signal. CR is photopic contrast, which means a contrast in which ambient light is taken into consideration. Cr is scotopic contrast, which means a contrast measured in a surrounding environment where no ambient light exists (that is, in a condition where illuminance is 0). OFF is luminance when displaying a full-black signal and there is no effect due to ambient light. BG denotes luminance increase caused by ambient light. Accordingly, photopic contrast can be represented as CR=L/(OFF+BG). Likewise, scotopic contrast is represented as Cr=L/OFF Further, a, b, c, and d are coefficients and in the following ranges.

a=0.00423339±0.002671539 b=0.007648902±0.005754385 d=−79.52542076±18.92439144 g=−0.7131531895±0.16046239

It is to be noted here that a=0.00423339, b=0.007648902, d=−79.52542076, and g=−0.7131531895 are respective typical values, and ±0.002671539, ±0.005754385, ±18.92439144, and ±0.16046239 show the permissible ranges for the respective typical values. Thus, the coefficients a, b, d, and g may be arbitrary values within the range from the lowest permissible values to the highest permissible values.

The coefficient γM is a coefficient relating to gray level characteristics and is defined by the following Equation (4):

$$\gamma M = \{(L5-L4)/(s5-s4) - (L2-L1)/(s2-s1)\}/L7 \quad \text{Eq. (4)}$$

In the above equation, Li (i=1 to 5) is the luminance of i-th gray level when the luminance L is divided equally into 7 luminances, si is the input signal level for displaying the i-th gray level. The maximum value of the input signal level is standardized at 255. For reference, the following Table 1 is provided to show the relationship between the characteristic values of the ordinary gray level characteristics, represented using exponential functions, and the gray level characteristics defined according to the present invention.

TABLE 1

| y  | 1.6 | 1.8 | 2 | 2.2 | 2.4 | 2.6 | 2.8 | 3 |
|---|---|---|---|---|---|---|---|---|
| yM | 0.001824 | 0.002277 | 0.0027 | 0.003105 | 0.003496 | 0.003877 | 0.004251 | 0.00462 |

Coefficient γM is employed as a coefficient relating to gray level characteristics because, even in cases where devices have input-output characteristics such that the γ value is not constant (for example, liquid crystal display elements generally show S-like shaped display characteristic curves), the γ values can be represented by one standardized γ value.

As has been described in Embodiments 1 and 2, when luminance is substantially monotonously decreased so that the detection limit luminance is obtained at the boundary of the display screen region having a screen diagonal ratio of 0.9, the brightness index, which is approximately proportional to psychological impression of brightness, decreases according to Eq. 3. As already discussed previously, despite the decrease in the brightness index, the decrease is not easily perceived as being a luminance slope. This is due to the fact that when a human observes a display screen, he or she does not observe the entire region thereof at once but rather observes a local region thereof, which causes a kind of optical illusion.

Figure 17:
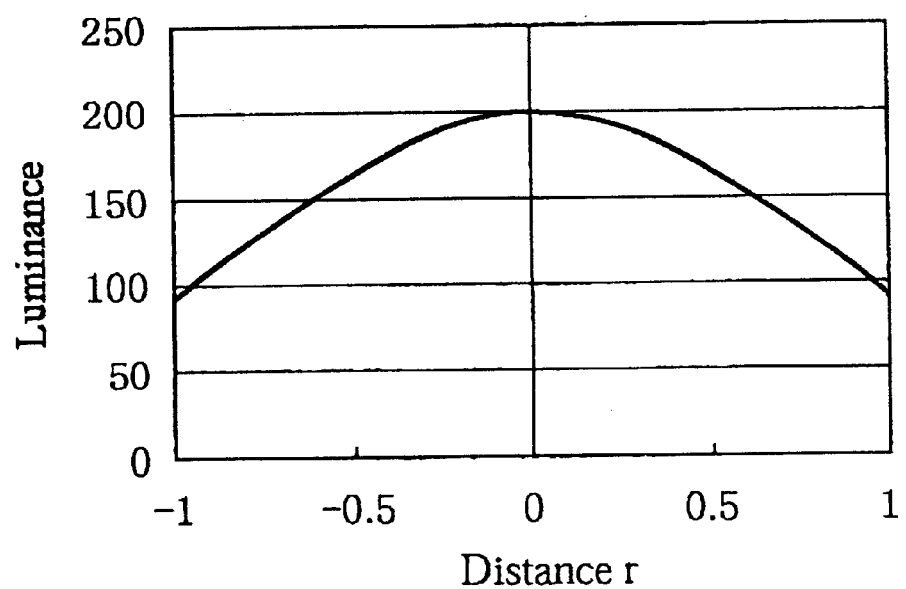
FIG. 17 is a graph illustrating a luminance gradient of a display device constructed according to Embodiment 3 of the present invention.
Figure 18:
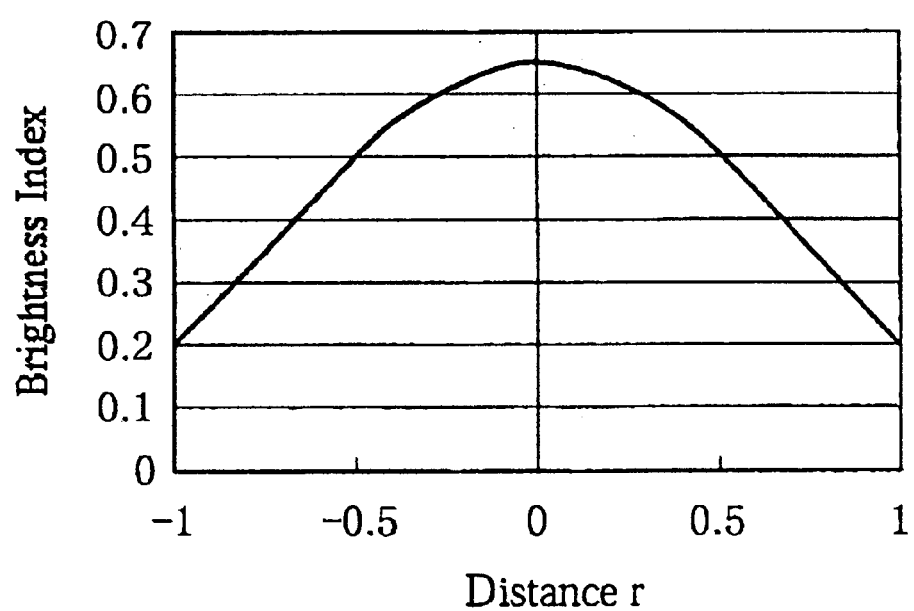
FIG. 18 is a graph illustrating a brightness index distribution of a display device constructed according to Embodiment 3 of the present invention.

Assume a case when the luminance gradient as shown in FIG. 17 is provided. The horizontal axis denotes distance expressed by screen diagonal, and the vertical axis denotes relative luminance when the luminance of the center is the reference point. In this example, at the boundary of the display screen region having a screen diagonal ratio of 0.9, the luminance is about 55% (detection limit luminance). In the case where photopic contrast is 100 and gray level characteristics are made uniform over the display screen at an ordinary value, 2.2, the brightness index decreases towards the periphery, as shown in FIG. 18. Within the detection limit luminance, no problem arises, but as the luminance at the boundary of the display screen region having a screen diagonal ratio of 0.9 is reduced below the detection limit luminance, the luminance gradient gradually becomes more perceivable.

Figure 19:
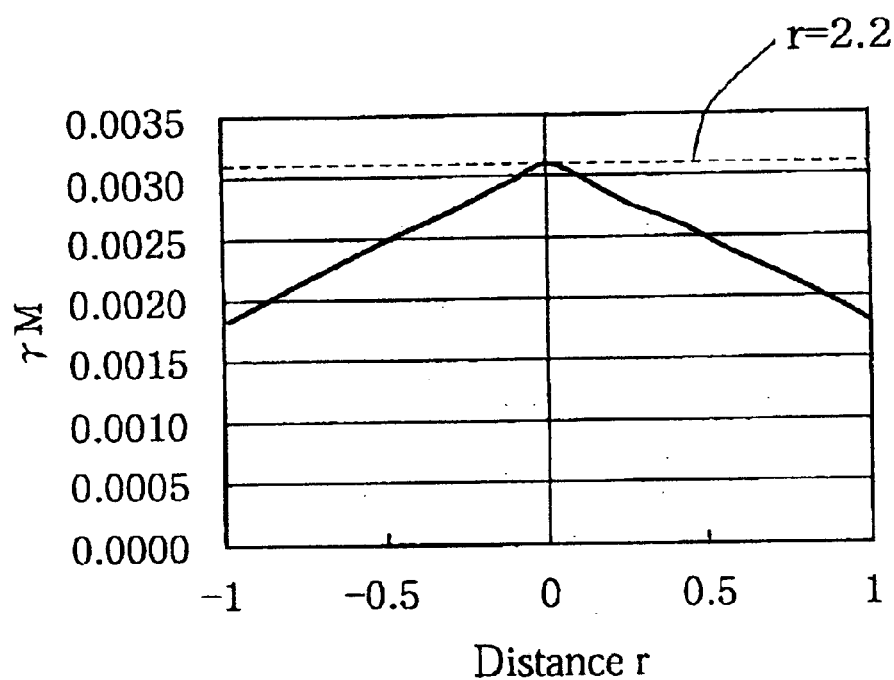
FIG. 19 is a graph illustrating gray level characteristics of a display device constructed according to Embodiment 3 of the present invention.
Figure 20:
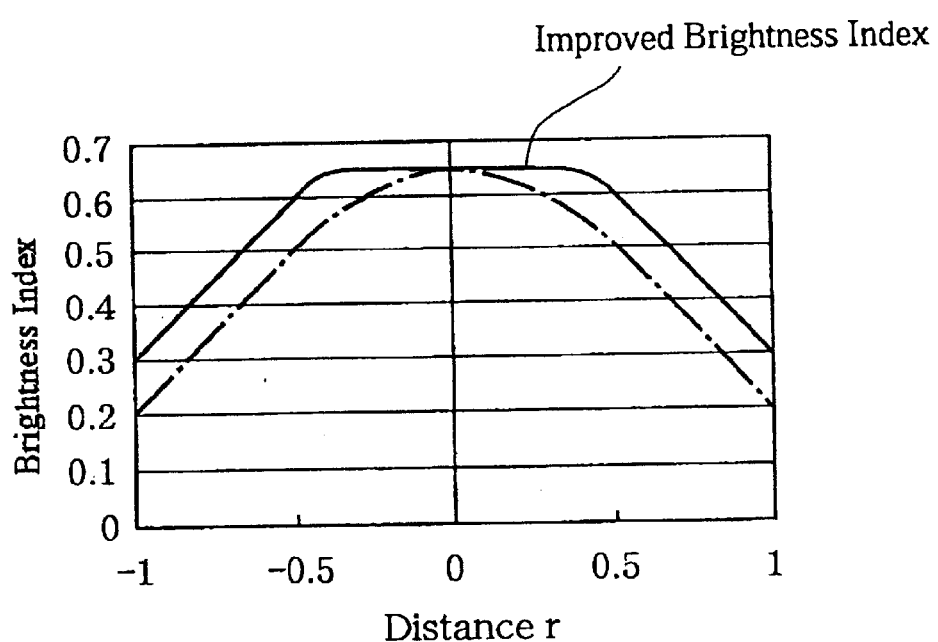
FIG. 20 is a graph illustrating an improvement in brightness index of a display device constructed according to Embodiment 3 of the present invention.

In view of this, according to a second aspect of the invention, all the gray level characteristics in the entire area of the display screen are not made uniform so that γ=2.2, but rather, the gray level characteristics are varied in the screen in the manner as shown in FIG. 19, in order to compensate the decrease in brightness index resulting from luminance decrease.

It is appreciated that, as a result of the varying of gray level characteristics as shown in FIG. 19, brightness index becomes substantially uniform within the region having a screen diagonal ratio of about 0.5, and the viewer's impression of brightness does not vary. That is, by varying gray level characteristics locally, the viewer's impression of brightness affected by decrease in luminance can be compensated.

As a consequence, even when the power consumption is further reduced by reducing the luminance at the boundary of the display screen region having a screen diagonal ratio of 0.9 to the detection limit luminance or lower, luminance variation is made less perceivable by varying gray level characteristics in the display screen in the manner such as described above.

For this purpose, the display device according to the present embodiment comprises a brightness index improving means. The brightness index improving means comprises, like the luminance gradient forming means described in Embodiment 2, a gray level characteristic adjusting means, and has a function for predetermining gray level characteristics according to the positions in the display screen so that the gray level characteristics are as shown in FIG. 19.

Now, a specific configuration is shown below.

Figure 21:
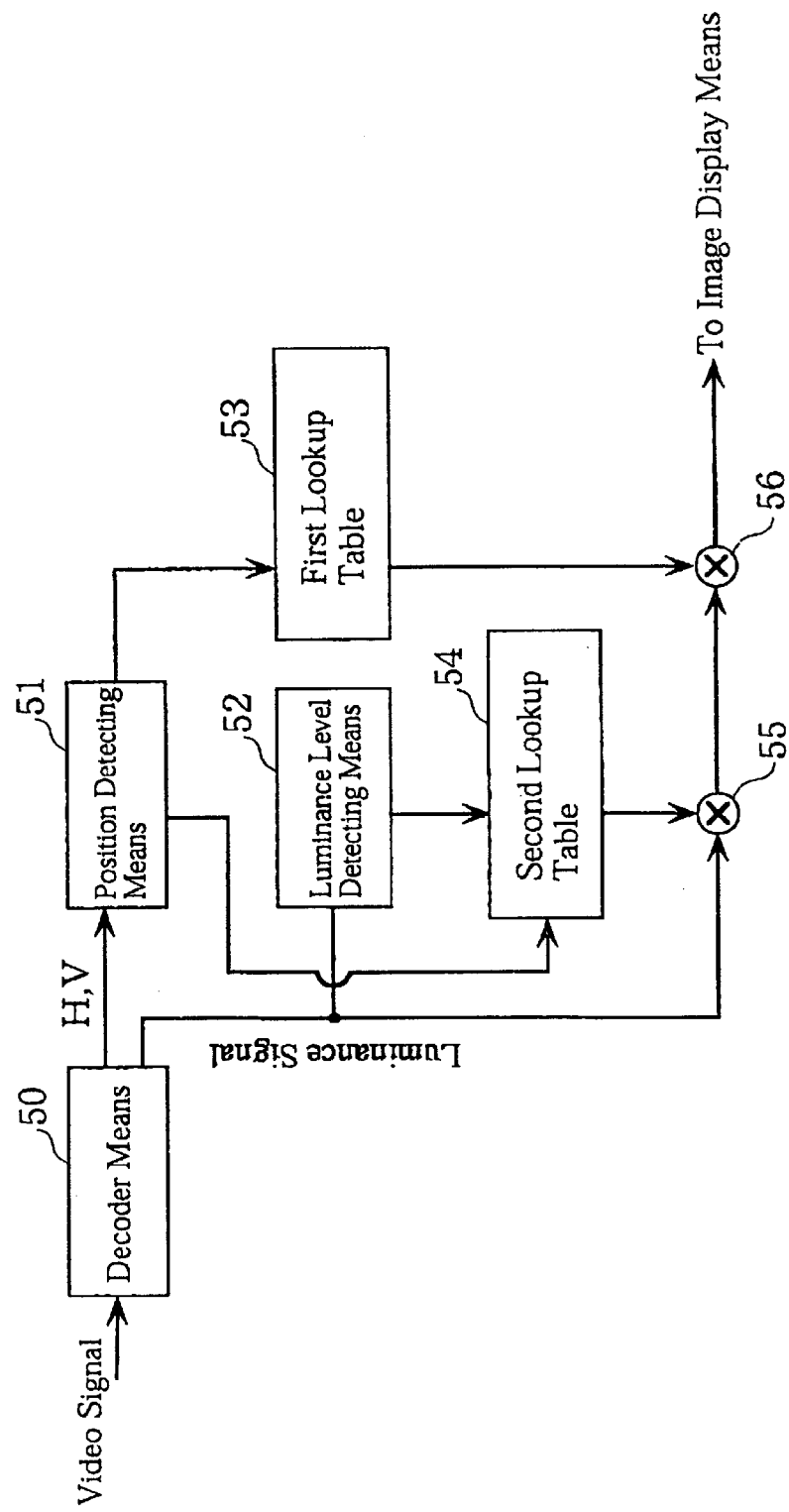
FIG. 21 is a block diagram showing a specific configuration of a signal processing unit in a display device according to Embodiment 3.

FIG. 21 is a block diagram showing a specific configuration of a signal processing unit of a display device according to Embodiment 3.

Reference numeral 50 denotes a decoder means, and the decoder means 50 separates a composite video signal into a luminance signal and a horizontal and a vertical synchronizing signal. Reference numeral 51 denotes a position detecting means in which two-dimensional positional coordinates of pixels (or dots) are detected, which is realized by, for example, a counter or the like. Reference numeral 52 denotes a luminance level detecting means for detecting a signal voltage level of video signal for each pixel. Reference numeral 53 denotes a first lookup table. As shown in FIG. 22, in order to substantially monotonously decrease brightness index BI from the substantially the center portion of the display screen towards a peripheral portion, the first lookup table 53 stores second multiplication gains which correspond to two-dimensional coordinate data, and upon receiving two-dimensional coordinate data from the position detecting means, it outputs first multiplication gains corresponding to the input. Reference numeral 54 denotes a second lookup table. As shown in FIG. 23, in order to vary the γM value for the peripheral portion of the display screen, the second lookup table 54 stores second multiplication gains corresponding to two-dimensional coordinates and luminance levels, and upon receiving two-dimensional coordinate data from the position detecting means and luminance level data from the luminance level detecting means, outputs second multiplication gains corresponding to the input. Reference numeral 55 denotes a first multiplying means and 56 a second multiplying means.

Figure 24A:
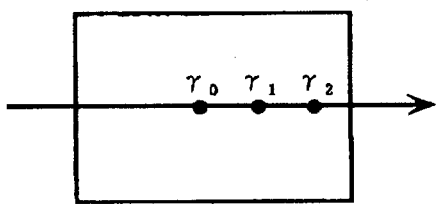
FIGS. 24($a$) to 24($c$) illustrate the method of determining second multiplication gains.

Now, a more detailed discussion of the second multiplication gains stored in the second lookup table will be described below. As shown in FIG. 24($a$), when three different positions r0, r1, and r2 are assumed, each of the positions r0, r1, and r2 has a different γ value, as shown in FIG. 24($b$). Specifically, γ=2.2, for example, at the position r0, γ=1.8, for example, at the position r1, and γ=1.5, for example, at the position r2. From each of the γ curves for each position r0, r1, and r2, output voltages corresponding to video signal levels are obtained, and the ratios of output voltages to the corresponding video signal levels are employed as second multiplication gains. Thus, in the present embodiment, the multiplication gains are determined by two parameters, positions of pixels and signal levels.

It is noted that, in order to calculate the second multiplication gains, the γ curves shown in FIG. 24($c$) may be employed in place of the γ curves shown in FIG. 24($b$). Advantages and effects of employing the γ curves shown in FIG. 24($c$) will be discussed later.

Next, referring to FIGS. 25 to 27, the operation of the signal processing unit in the above-described configuration is explained. FIGS. 25 to 27 show examples of signal conversion concerning a scanning line through substantially the center of the display screen, FIG. 25 showing a case when all the signal levels for the scanning line are 100% luminance, FIG. 26 a case when all the signal levels are 50% luminance, and FIG. 27 a case when the first half of the signal levels for the scanning line is 50% while the second half is 100% luminance. Referring first to FIGS. 25(a) to (e), in the case of the signal levels shown in FIG. 25(a), the second multiplication gains read out from the second lookup table 54 are as shown in FIG. 25(b). Accordingly, output from the first multiplying means 55 is as shown in FIG. 25(c). Meanwhile, the first lookup table 53 outputs first multiplication gains such that brightness index BI is substantially monotonously decreased from substantially the center portion of the display screen towards the peripheral portion, and as a result, the scanning line as a whole shows a gain characteristic as shown in FIG. 25(d). Then, the second multiplying means 56 multiplies the luminance levels as shown in FIG. 25(c) with the luminance levels shown in as FIG. 25(d), whereby luminance levels as shown in FIG. 25(e) result. In summary, the luminance signal as shown in FIG. 25(a) is signal converted into the luminance signal as shown in FIG. 25(e).

Figure 26A:
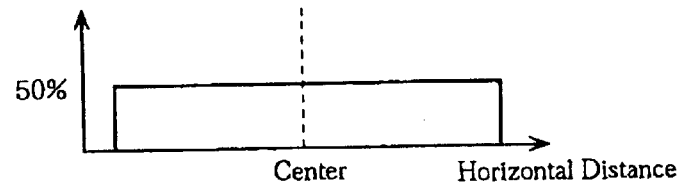
FIGS. 26($a$) to 26($e$) illustrate a signal conversion process in the case when all the signal levels for a scanning line are 50% luminance.
Figure 26B:
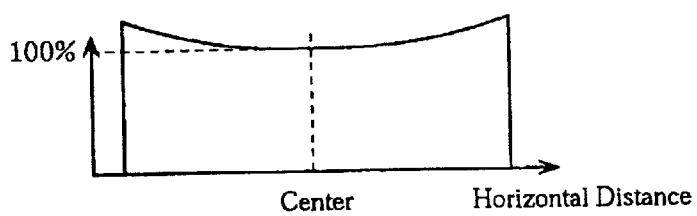
Figure 26C:
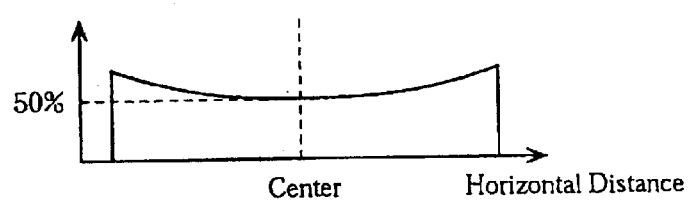
Figure 26D:
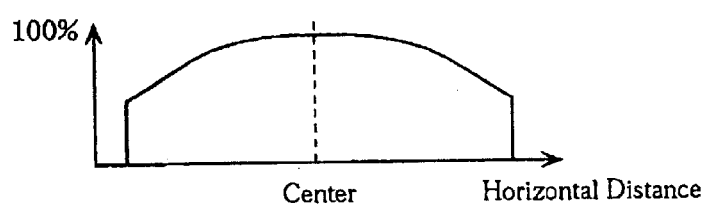
Figure 26E:
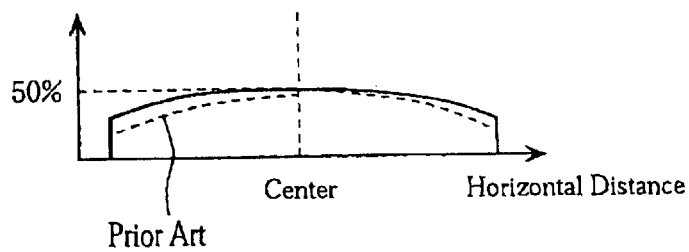

In a similar manner, in the case of signal levels as shown in FIG. 26(a), the luminance signal is signal converted into a luminance signal as shown in FIG. 26(e). In this case, in periphery portions on both sides of the display screen, luminance levels are increased by varying the gray level characteristics of halftone levels.

Also in a similar manner, in the case of signal levels as shown in FIG. 27(a), the luminance signal is signal converted into a luminance signal as shown in FIG. 27(e). In this case, in the peripheral portion on the left-hand side of the display screen, luminance levels are increased by varying gray level characteristics.

Thus, brightness index BI is improved so that brightness index substantially monotonously decreases from substantially the center portion of the display screen towards the peripheral portion and luminance level increases in the peripheral portion, and thereby, compared to cases where luminance is made uniform over the entire screen, reduction in power consumption is achieved without reducing the viewer impression of brightness.

Furthermore, to prevent reduction in the viewer impression of brightness caused by luminance decrease in peripheral portions, it is possible to make luminance gradient less perceivable without increasing power consumption by optimizing gray level characteristics.

For reference, it might be conceived possible that, without providing a luminance detecting means, multiplication gains are determined based on only one parameter, positions of pixels, and the obtained multiplication gains are multiplied with the signal levels of the video signal, so that the center of the display screen is made bright and the periphery dark. However, in this case, gains are the same for every gray level, that is, every gray level has the same decrease rate, and the luminance gradient is easily perceived. On the contrary, in a configuration as in the present embodiment in which multiplication gains are determined based on two parameters, positions of pixels and signal levels, the gains vary for each gray level, and as a consequence, by reducing the gains for lower gray levels, luminance gradient is made less noticeable.

Figure 24B:
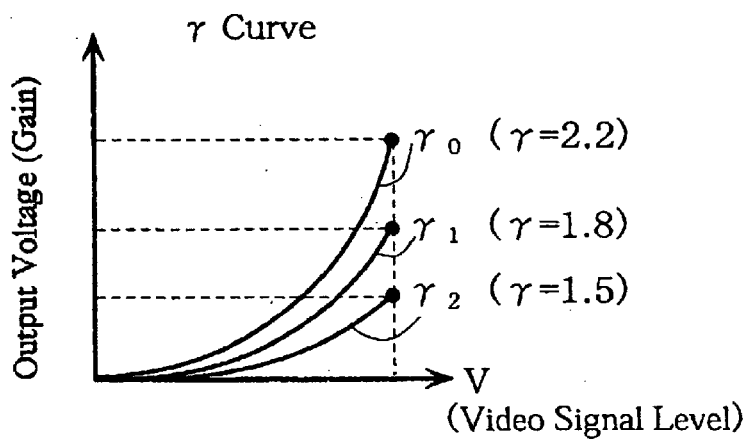
Figure 24C:
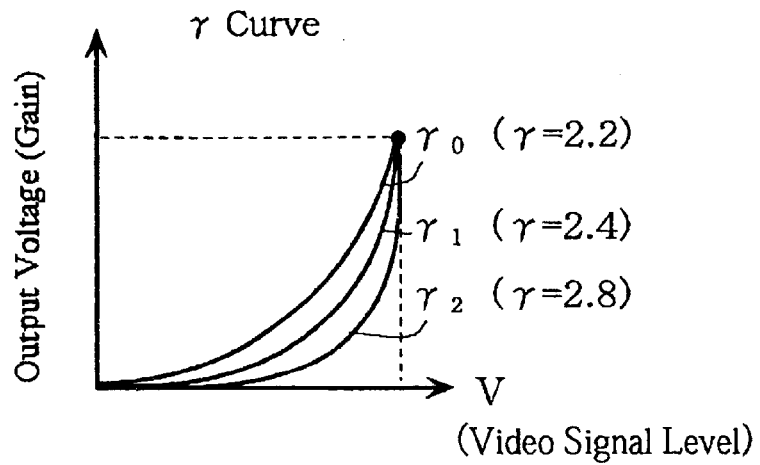
Figure 25A:
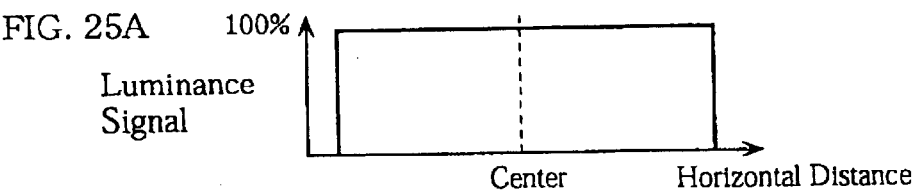
FIGS. 25($a$) to 25($e$) illustrate a signal conversion process in the case when all the signal levels for a scanning line are 100% luminance.
Figure 25B:
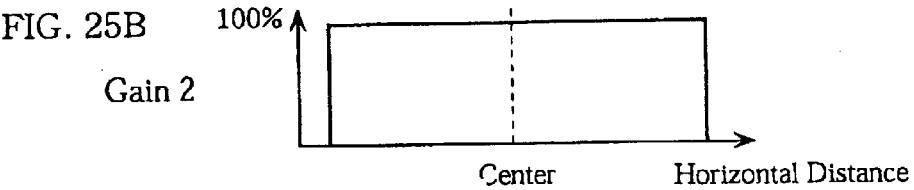
Figure 25C:
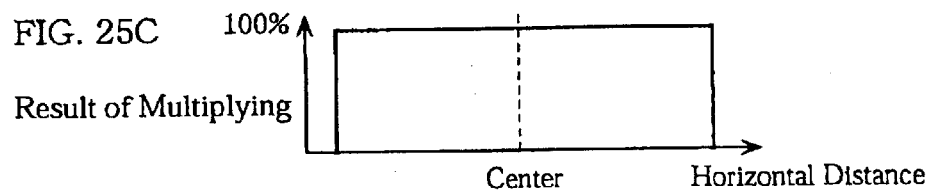
Figure 25D:
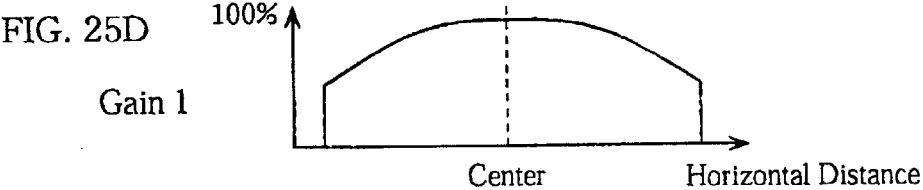
Figure 25E:
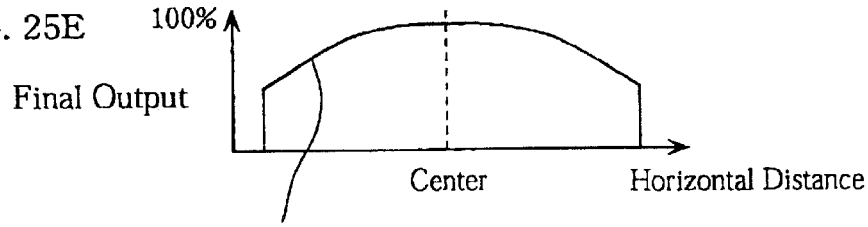

Although, in the example described above, the second multiplication gains are determined based on the γ curves shown in FIG. 24(b), the γ curves shown in FIG. 24(c) may be used in place of the γ curves shown in FIG. 24(b). In the case of the γ curves shown in FIG. 24(b), luminance is previously decreased in the peripheral portion by using the first multiplication gains, and the gray level characteristics are compensated in all the regions from white level to halftone regions. On the other hand, in the case of the γ curves shown in FIG. 24(c), luminance is made uniform over the entire display screen (or very slightly decreased in the peripheral portion), and the gray level characteristics are not compensated at the white level but they are compensated only in halftone regions to perform display. By display with such gray level characteristic compensation, viewer perception of brightness can be maintained and power consumption reduced. The reason is that when image display is performed based on video signal, it is very unusual that the entire screen displays white, and therefore, perception of brightness is sufficiently maintained even when gray level characteristics are compensated based on the γ curves shown in FIG. 24(c). For a specific configuration in which the γ curves shown in FIG. 24(c) are employed, a first lookup table 53 is used such that the first multiplication gains of approximately "1" result for any positions, and the second lookup table stores gains such that the γ curves shown in FIG. 24(c) are obtained. Alternatively, it is possible to use only the second lookup table that stores gains such that the γ curves shown in FIG. 24(c) are obtained, and the first lookup table 53 may be omitted.

EMBODIMENT 4

Figure 28:
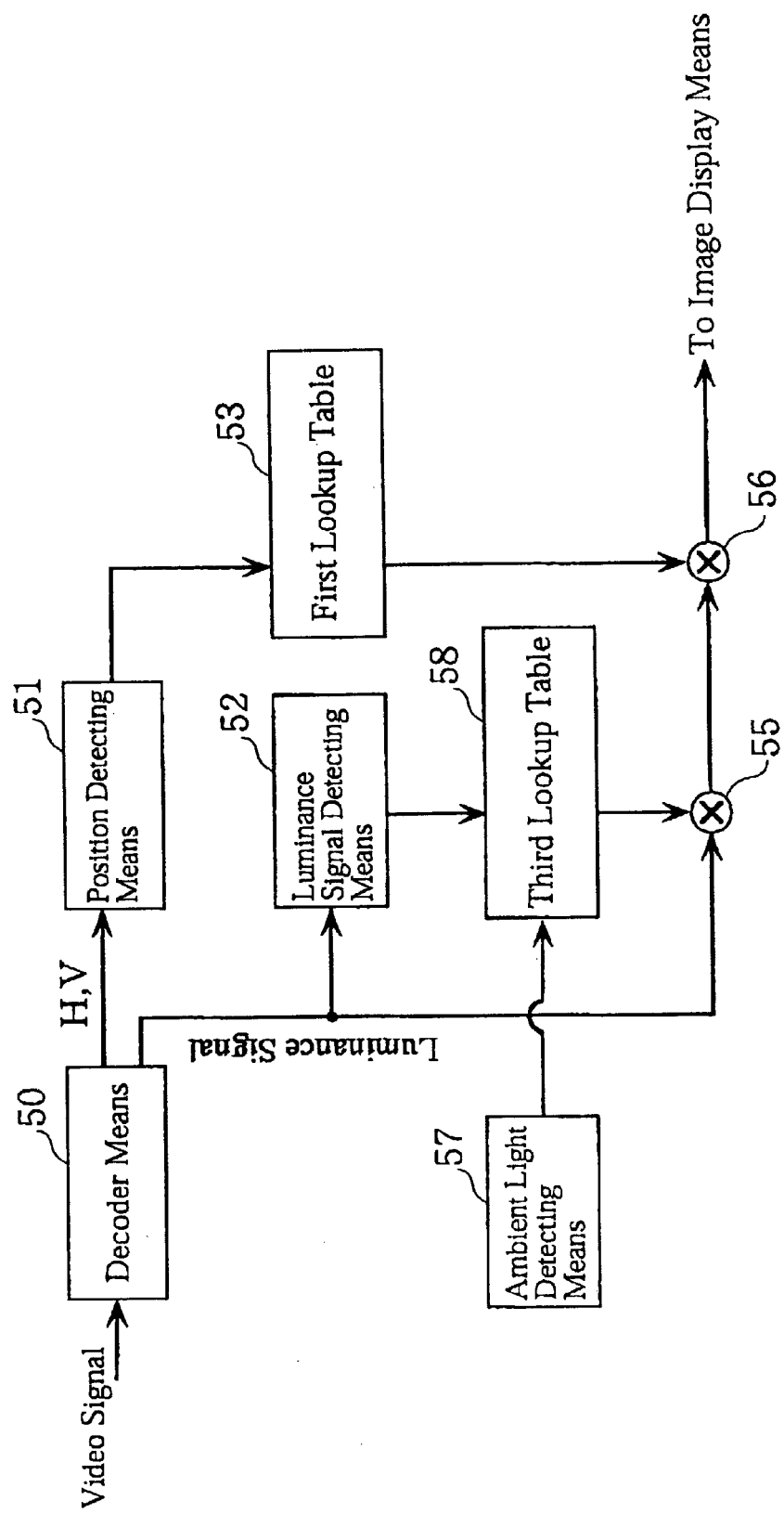
FIG. 28 is a block diagram showing the configuration of a signal processing unit of a display device constructed according to Embodiment 4.

FIG. 28 shows a block diagram illustrating the configuration of the signal processing unit in a display device according to Embodiment 4. Embodiment 4 is analogous to the foregoing Embodiment 3, and like parts are indicated by like reference numerals. A characteristic feature of Embodiment 4 is that fluctuation of photopic contrast CR caused by ambient light is compensated and thereby the viewer's perception of brightness is maintained without being affected by ambient light. Referring to FIG. 28, the specific configuration is described below. In a display device according to the present embodiment, an ambient light detecting means 57 for detecting ambient light levels is additionally provided, and in place of the second lookup table 54, a third lookup table 58 is provided. The third lookup table 58 stores, as shown in FIG. 29, third multiplication gains in order to compensate the brightness index which has been caused to fluctuate by ambient light. The operation in this configuration is basically the same as that illustrated in FIGS. 25–27. According to the operation illustrated in FIGS. 25–27, the brightness index caused to fluctuate by ambient light is improved, and this makes it possible to maintain the viewer's perception of brightness without being affected by ambient light.

In the respect that the influence of ambient light on the contrast should be compensated, the first lookup table is not necessarily an essential component.

EMBODIMENT 5

Figure 30:
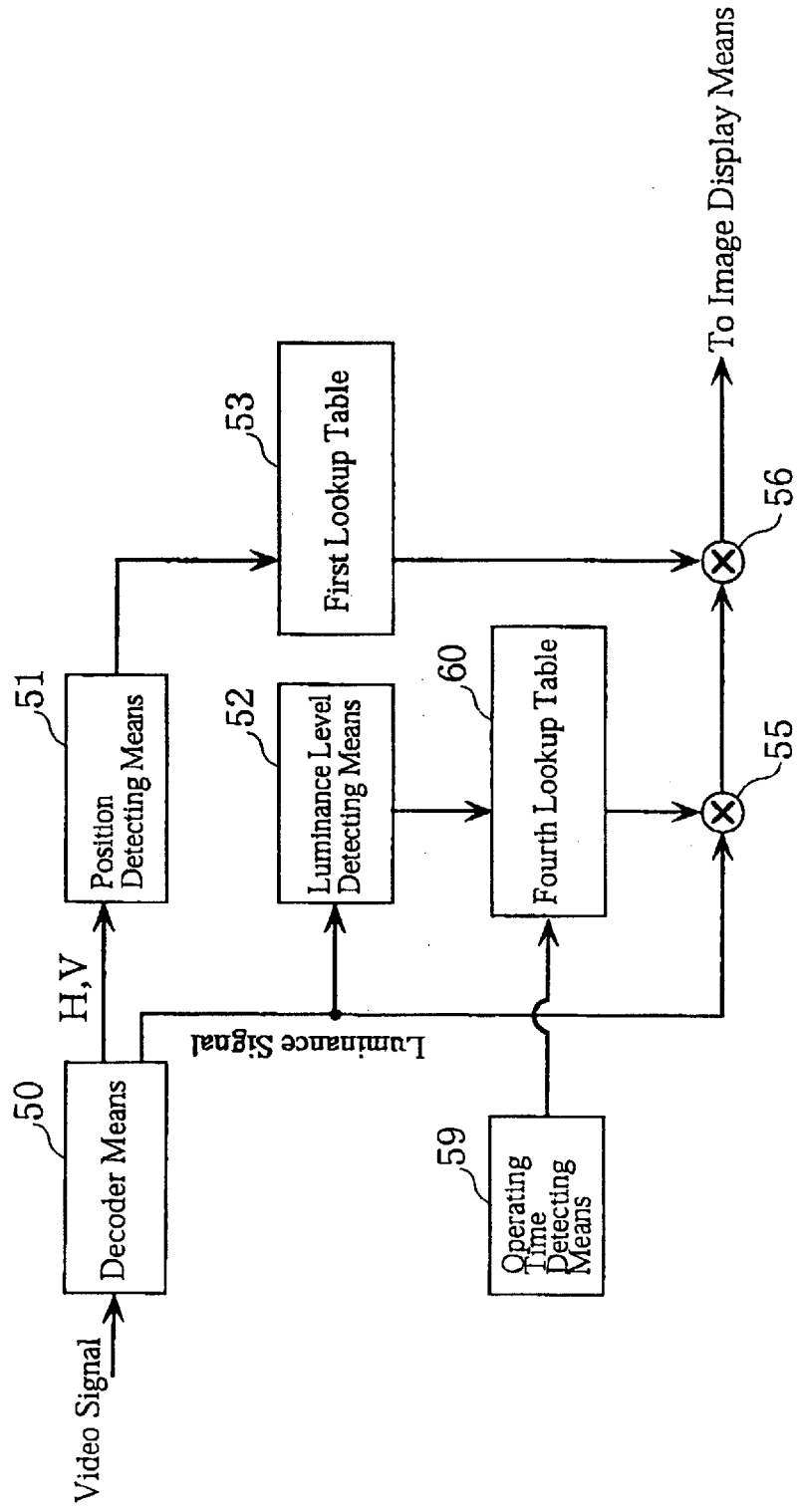
FIG. 30 is a block diagram showing the configuration of a signal processing unit in a display device according to Embodiment 5 of the present invention.

FIG. 30 shows a block diagram illustrating the configuration of a signal processing unit in a display device according to Embodiment 5. Embodiment 5 is similar to Embodiment 4, and like parts are referred to by like reference numerals. Embodiment 5 is characterized in that fluctuation of peak luminance induced by operating time of a display device is compensated and thereby viewer's perception of brightness is maintained without being affected by the operating time. In order to accomplish this object, in the present Embodiment 5, an operating time detecting means 59 for detecting the operating time of the display device is provided in place of the ambient light detecting means 57 described in the foregoing Embodiment 4, and a fourth lookup table 60 is provided in place of the third lookup table 58. The fourth lookup table 60 stores fourth multiplication gains in order to compensate the peak luminance caused to fluctuate by the operating time. The operating time detecting means 59 is realized by, for example, a timer or the like. The operation in this configuration is basically the same as that illustrated in FIGS. 25–27. According to the operation illustrated in FIGS. 25–27, the brightness index caused to fluctuate by operating time is improved, and this makes it possible to maintain viewer's perception of brightness without being affected by operating time.

In the respect that the peak luminance that is caused to fluctuate because of display time should be compensated, the first lookup table is not necessarily an essential component.

EMBODIMENT 6

Figure 31:
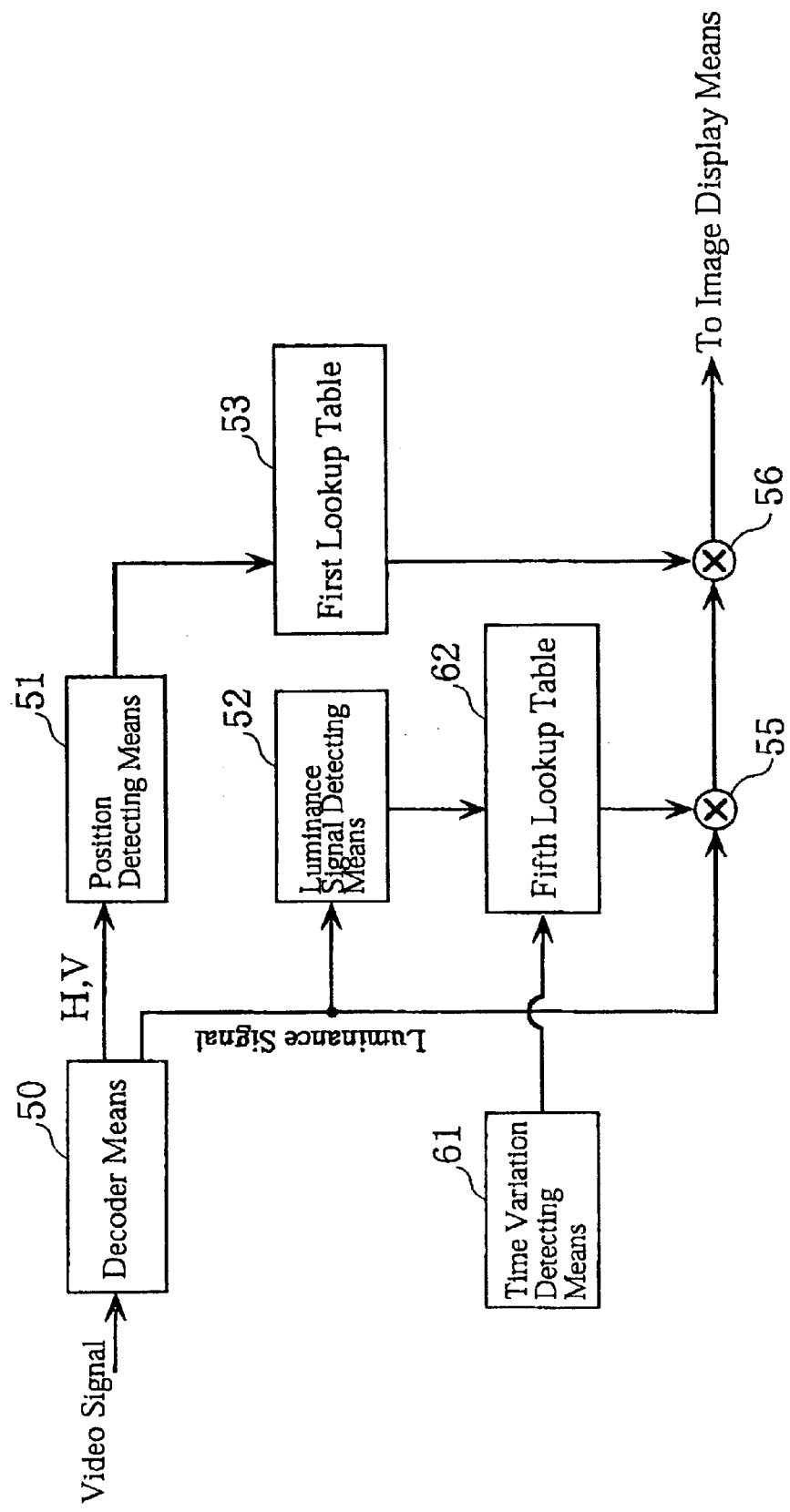
FIG. 31 is a block diagram showing the configuration of a signal processing unit in a display device according to Embodiment 6 of the present invention.
Figure 32:
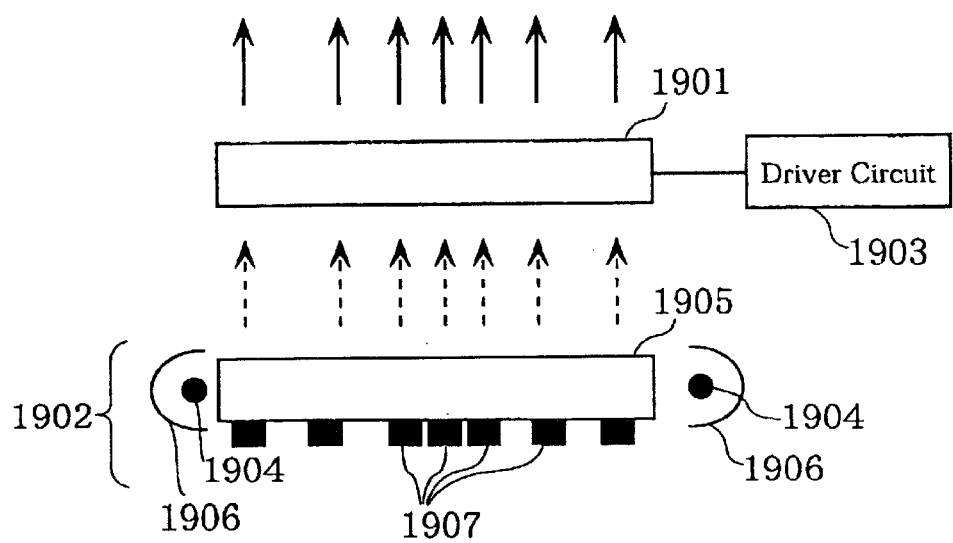
FIG. 32 shows the construction of a prior art display device.
Figure 33:
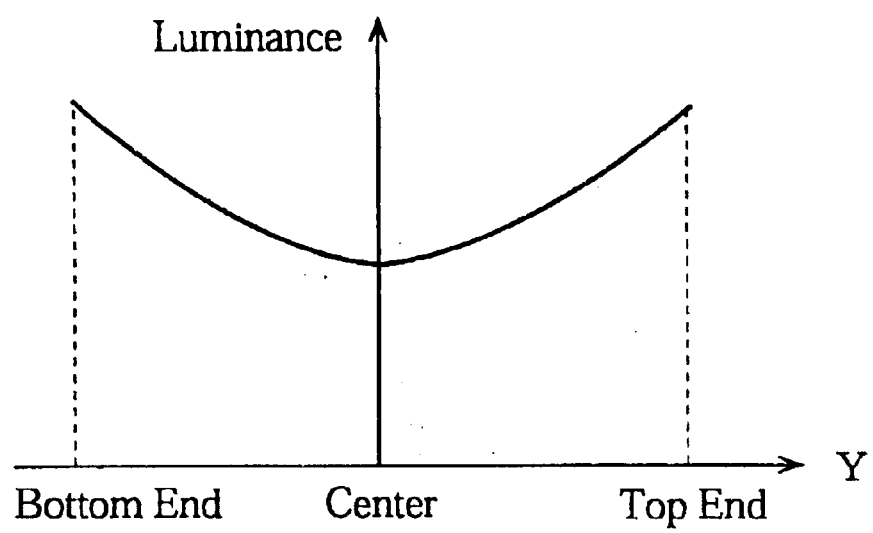
FIG. 33 illustrates the luminance gradient in the prior art display device.
Figure 34:
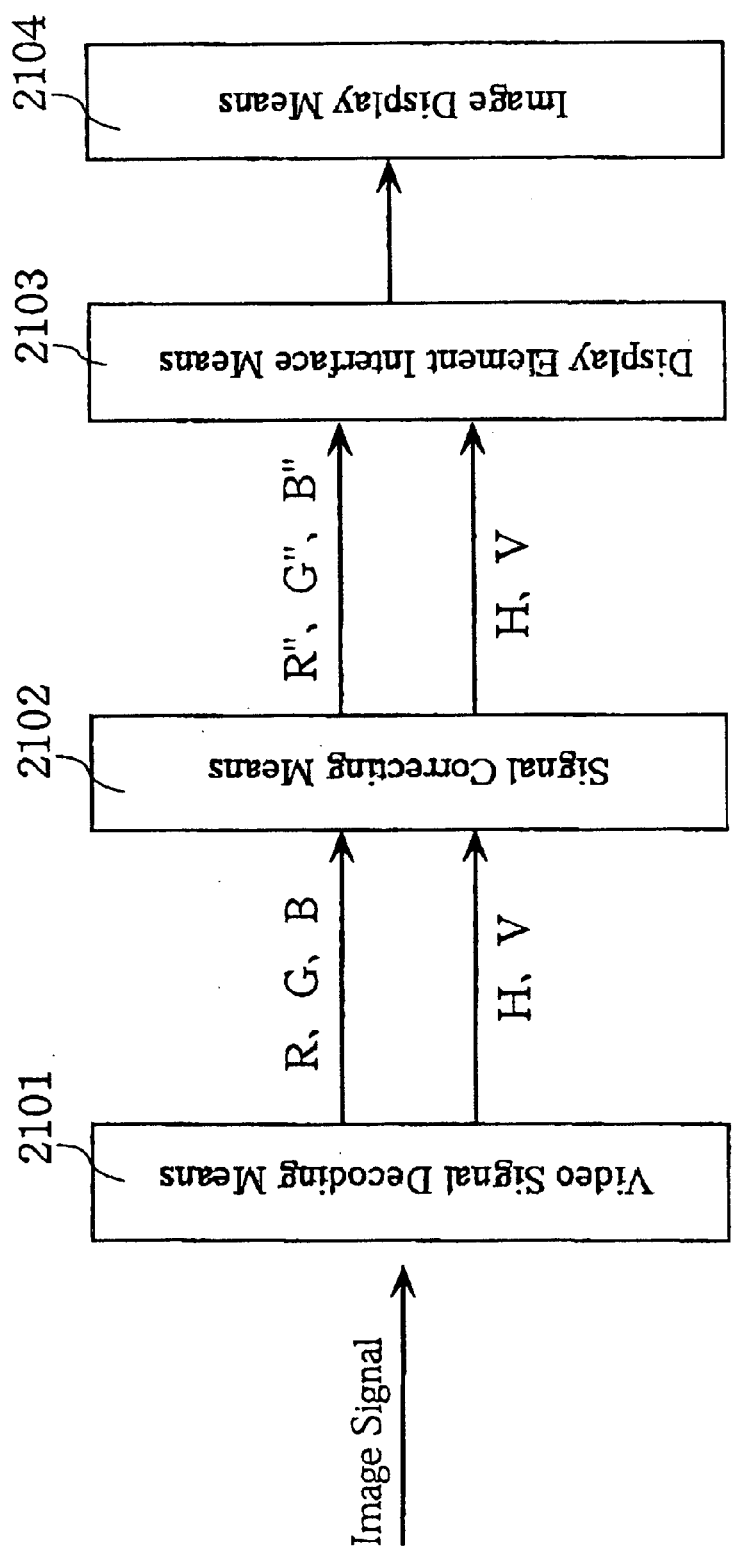
FIG. 34 is a block diagram of a driving means in the prior art display device.

FIG. 31 shows a block diagram illustrating the configuration of a signal processing unit in a display device according to Embodiment 6. Embodiment 6 is similar to Embodiment 5 described above, and like parts are referred to by like reference numerals. In Embodiment 6, time variation detecting means 61 for detecting variation over time is provided in place of the operating time detecting means 59 provided in Embodiment 5, and in place of the fourth lookup table 60, a fifth lookup table 62 is provided that stores fifth multiplication gains for compensating the peak luminance that is caused to fluctuate due to variation over time. The time variation detecting means 61 is realized, for example, by a light sensor that detects an actual luminance at the display screen. In the operating time detecting means 59, the peak luminance that decreases over a certain time is determined by prescribed data, but the time variation detecting means 61 differs therefrom in that it detects an actual decrease of the peak luminance. In the case of the configuration shown in FIG. 31, the brightness index that has been caused to fluctuate because of variation over time is improved, and this makes it possible to maintain perceived brightness without being affected by variation over time.

In the respect that the peak luminance that is caused to fluctuate because of variation over time should be compensated, the first lookup table is not necessarily an essential component.

SUPPLEMENTARY REMARKS FOR EMBODIMENTS 3 TO 6

(1) In the configurations of the foregoing Embodiments 3 to 6, brightness index BI is substantially monotonously decreased from substantially the center portion of the display screen towards the peripheral portion while luminance is increased in the peripheral portion. The present invention is not so limited, however, and it is also possible to make brightness index BI uniform over the entire screen by varying the stored data in the lookup tables.

(2) In the actual determining of γM, it is important that how much γM is to be changed be determined taking gray level characteristics into consideration. For example, brightness index over the entire display screen region is easily made completely uniform by introducing luminance into Eq. (3) and thereby obtaining the gray level characteristic coefficient γM, but this may impair gray level characteristics. In view of this, it is preferable that as shown in FIG. 18, a value corresponding to γ=1.6 is preferable as a limit.

(3) As described previously, the area that a human can observe carefully at one time is as small as a display screen region having a screen diagonal ratio of about 0.5 when the display screen size is 15" or larger. For this reason, it is possible that only brightness index within a display screen region having a screen diagonal ratio of 0.5 be substantially matched with the brightness index of the center of the display screen, and brightness index in the peripheral portion not be compensated but rather gradually varied.

(4) In a display device having scattering microdots as the luminance gradient forming means, such as a liquid crystal display device as described in Embodiment 1, when asymmetrical characteristics of the luminance distribution profiles are increased for a certain reason, brightness index accordingly shows asymmetrical distribution profiles. In view of this, it is possible to improve the asymmetrical characteristics of brightness index in the display screen using a brightness index improving means so that desired distribution profiles are obtained based on Eq. (3).

(5) In the display devices described in Embodiments 1 to 6, when the luminance distribution is shifted from a desired slope for a certain reason, for example, due to pixel defects or the like, it is possible that brightness index be varied with a desired, gradual slope by appropriately optimizing gray level characteristics in the display screen using a brightness index improving means.

(6) As described above, when luminance gradient is formed from the center of the display screen towards the peripheral portion, the luminance variation can be made less perceivable by optimizing gray level characteristics in the display screen according to Equation (3). Consequently, it is possible to make luminance variation not to be perceived by image viewers even when the luminance at the boundary of the display screen region having a screen diagonal ratio of 0.9 is reduced below the detection limit luminance. It is of course possible that, even when the luminance is reduced to approximately the same as or above the level of the detection limit, brightness index be compensated by the distribution of gray level characteristics in the screen.

(7) It is also possible to make less noticeable the luminance unevenness which often causes problems in liquid crystal display elements having a so-called direct backlight. With the direct backlight, which has a configuration such that several light sources are disposed directly behind a liquid crystal display element, when images are observed, the portions directly above the lamps appear bright while the portions between the lamps dark. By appropriately adjusting gray level characteristics using the brightness index improving means as described in the foregoing Embodiments 3 to 6 so as to compensate the luminance decrease, brightness index can be made uniform within the display screen, and therefore, it is made possible to improve picture quality degradation caused by such a luminance distribution.

The present invention is not limited to Embodiments 1 to 6 described above. It should be construed to include various modifications insofar as they come within the scope of the appended claims.

INDUSTRIAL APPLICABILITY

The objects of the present invention are fully accomplished by the constructions of the invention described above. Specifically, the following are achieved.

(1) According to the first aspect of the invention, luminance is gradually decreased from the center of the display screen without allowing the image viewer to perceive the decrease, and consequently, power consumption is reduced.

(2) According to the second aspect of the invention, luminance gradient is made even less perceivable by varying gray level characteristics in the display screen using a brightness index improving means to improve viewer's impression of brightness which has been adversely affected by luminance gradients. Accordingly, combined with the first aspect of the invention, the second aspect of the invention achieves even further reduction in power consumption.

INDUSTRIAL APPLICABILITY

The objects of the present invention are fully accomplished by the constructions of the invention described above. Specifically, the following are achieved.

(1) According to the first aspect of the invention, luminance is gradually decreased from the center of the display screen without allowing the image viewer to perceive the decrease, and consequently, power consumption is reduced.

(2) According to the second aspect of the invention, luminance gradient is made even less perceivable by varying gray level characteristics in the display screen using a brightness index improving means to improve viewer's impression of brightness which has been adversely affected by luminance gradients. Accordingly, combined with the first aspect of the invention, the second aspect of the invention achieves even further reduction in power consumption.

What is claimed is:

1. An image display device, comprising:

an image display means;

a luminance gradient forming means for forming a luminance gradient wherein when the image display means displays a display screen of a full-white signal the image display means substantially continuously decreases luminance of the image display means from substantially a center portion of the display screen towards a peripheral portion thereof without increasing luminance of the center portion;

wherein the luminance gradient forming means further comprises a means for forming a luminance at a point in the display screen substantially equal to a luminance gradient function $f(x,y)$, where the point has a distance x from an origin at substantially the center of the display screen in a horizontal direction and a distance y from the origin in a vertical direction; and wherein the luminance gradient function $f(x,y)=f(r)$ where $f(r)$ is a luminance distribution profile function $r(x,y)$ and is for specifying a profile of the distribution.

2. The image display device according to claim 1, wherein the luminance distribution profile function comprises $r=(x^2+y^2)^{(1/2)}$.

3. The image display device according to claim 1, wherein the luminance distribution profile function comprises $r=((x/a)^2+(y/6)^2)^{(1/2)}$, where a and b are positive constants.

4. The image display device according to claim 3, wherein a ratio of the positive constants a and b is substantially equal to a ratio selected from the group of ratios consisting of 4:3, 16:9, and 5:4.

5. The image display device according to claim 1, wherein the luminance distribution profile function comprises $r=\text{rect}(1/h \times x, 1/v \times y)$, where h is a horizontal length and v is a vertical length of the display image.

6. The image display device according to claim 1, wherein the luminance distribution profile function comprises $r=\text{rect}(1/(h \times (x \times \cos\theta - y \times \sin\theta)), 1/(v \ x(x \times \sin\theta + y \times \cos\theta)))$, where h is a horizontal length of and v is a vertical length of the display image.

7. The image display device according to claim 1, wherein the luminance distribution profile function comprises $r=x$ or $r=y$.

8. The image display device according to claim 1, wherein the luminance gradient function $f(r)$ substantially continuously decreases with respect to r.

9. The image display device according to claim 8, wherein the luminance gradient function comprises $f(r)=-a \times r+b$, where a and b are positive constants.

10. The image display device according to claim 8, wherein the luminance gradient function comprises $f(r)=a \times \exp(-b \times r)$, where a and b are positive constants.

11. The image display device according to claim 8, wherein the luminance gradient function comprises $f(r)=a \times \exp\{-(r/b)^2/2\}$, where a and b are positive constants.

12. The image display device according to claim 8, wherein the luminance gradient function comprises $f(r)=-a \ x \ r^b+c$, where a, b, and c are positive constants.

13. The image display device according to claim 8, wherein the luminance gradient function comprises $f(r)=a \times \cos(2\pi/\lambda \times b \times r)$, where a, b, and $\lambda$ are positive constants.

14. The image display device according to claim 8, wherein the luminance gradient function comprises $f(r)-a/(b \times r+c)+d$, where a, b, c, and d are positive constants.

15. An image display device comprising, an image display means;

a luminance gradient forming means for forming a luminance gradient wherein, when the image display means displays a display screen of a full-white signal, the image display means substantially continuously decreases luminance of the image display means from substantially a center portion of the display screen towards a peripheral portion thereof without increasing luminance of the center portion, wherein the luminance gradient forming means further comprises a transparent light guiding member and a plurality of scattering micro-members being, the micro-members located on a back surface of the light guiding member.

16. The image display device according to claim 15, wherein a two dimensional distribution of an aperture area of the micro-members or a density of the micro-members is substantially equal to a desired luminance distribution value divided by a luminance distribution value obtained when such density or such an aperture area of the micro-members is uniform over the entire back surface area.

17. An image display device comprising:

an image display means; and a luminance gradient forming means comprising:

a luminance level detecting means for detecting signal levels of a video signal for respective pixels;

a position detecting means for detecting two-dimensional coordinate data of the video signal in an image;

a lookup table for storing multiplication gains determined based on predetermined $\gamma$ curves wherein differing positions have different $\gamma$ curves and are determined corresponding to detected signal levels, for receiving two-dimensional coordinate data from the position detecting means and luminance level data from the luminance level detecting means, and for outputting the multiplication gains corresponding to the received data; and a multiplying means for multiplying the signal levels of a video signal by the multiplication gains outputted from the lookup table.

18. An image display device comprising:

an image display means; and a luminance gradient forming means comprising:

a luminance level detecting means for detecting signal levels of a video signal for respective pixels;

an ambient light detecting means for detecting ambient light levels on a display screen;

a lookup table for compensating a $\gamma$ value affected by fluctuation of contrast caused by ambient light, the lookup table for storing multiplication gains determined corresponding to ambient light levels and signal levels, for receiving ambient light level data from the ambient light detecting means and luminance level data from the luminance level detecting means, and for outputting the multiplication gains corresponding to the received data; and a multiplying means for multiplying signal levels of a video signal by the multiplication gains outputted from the lookup table.

19. An image display device comprising:
an image display means; and
a luminance gradient forming means comprising:
- a luminance level detecting means for detecting signal levels of a video signal for respective pixels;
- an operating time detecting means for detecting image display time;
- a lookup table for compensating a γ value affected by fluctuation of peak luminance caused by variation over time, the lookup table for storing multiplication gains determined corresponding to image display time and signal levels, for receiving image display time data from the operating time detecting means and luminance level data from the luminance level detecting means, and for outputting the multiplication gains corresponding to the received data; and
- a multiplying means for multiplying signal levels of a video signal by the multiplication gains outputted from the lookup table.

20. An image display device comprising:
an image display means; and
a luminance gradient forming means comprising:
- a luminance level detecting means for detecting signal levels of a video signal for respective pixels;
- a time variation detecting means for detecting levels of luminance variation over time;
- a lookup table for compensating a γ value affected by fluctuation of peak luminance caused by variation over time, the lookup table for storing multiplication gains determined corresponding to levels of variation over time and signal levels, for receiving level data of variation over time from the time variation detecting means and luminance level data from the luminance level detecting means, and for outputting the multiplication gains corresponding to the received data; and
- a multiplying means for multiplying signal levels of a video signal by the multiplication gains outputted from the lookup table.

21. An image display device comprising:
an image display means;
a luminance gradient forming means for forming a luminance gradient wherein, when the image display means displays a display screen of a full-white signal, the image display means substantially continuously decreases luminance of the image display means from substantially a center portion of the display screen towards a peripheral portion thereof without increasing luminance of the center portion; wherein the luminance gradient forming means comprises:
- a position detecting means for detecting two-dimensional coordinate data of the video signal in an image;
- a luminance level detecting means for detecting signal levels of a video signal for respective pixels;
- a first lookup table for modulating a luminance for forming a predetermined luminance gradient from substantially the center of the display screen towards a peripheral portion, the first lookup table for storing first multiplication gains corresponding to two-dimensional coordinate data, for receiving two-dimensional coordinate data from the position detecting means, and for outputting the first multiplication gains corresponding to the received data;
- a second lookup table for storing second multiplication gains determined based on γ predetermined curves wherein differing positions have different γ curves and determined corresponding to the signal levels, for receiving two-dimensional coordinate data from the position detecting means and luminance level data from the luminance level detecting means, and for outputting the second multiplication gains corresponding to the received data;
- a first multiplying means for multiplying signal levels of a video signal by the first multiplication gains outputted from the first lookup table; and
- a second multiplying means for multiplying the results of the multiplying of the first multiplying means by the first multiplication gains outputted from the first lookup table, for calculating a second multiplying means output, wherein the image display means is for displaying an image according to the second multiplying means output.

22. An image display device comprising:
an image display means;
a luminance gradient forming means for forming a luminance gradient wherein, when the image display means displays a display screen of a full-white signal, the image display means substantially continuously decreases luminance of the image display means from substantially a center portion of the display screen towards a peripheral portion thereof without increasing luminance of the center portion, wherein the luminance gradient forming means comprises:
- a position detecting means for detecting two-dimensional coordinate data of the video signal in an image;
- a luminance level detecting means for detecting signal levels of a video signal for respective pixels;
- an ambient light detecting means for detecting ambient light levels on a display screen;
- a first lookup table for modulating a luminance for forming a predetermined luminance gradient from substantially the center of the display screen towards a peripheral portion, the first lookup table for storing first multiplication gains corresponding to two-dimensional coordinate data, for receiving two-dimensional coordinate data from the position detecting means, and for outputting the first multiplication gains corresponding to the received data;
- a third lookup table for compensating a γ value affected by fluctuation of contrast caused by ambient light, the third lookup table for storing third multiplication gains determined corresponding to ambient light levels and signal levels, for receiving ambient light level data from the ambient light detecting means and luminance level data from the luminance level detecting means, and for outputting the third multiplication gains corresponding to the received data;
- a third multiplying means for multiplying the signal levels of the video signal by the third multiplication gains outputted from the third lookup table; and
- a sixth multiplying means for multiplying the results of the multiplying of the third multiplying means by the first multiplication gains outputted from the first lookup table, for calculating a sixth multiplying means output, wherein the image display means is for displaying an image according to the six multiplying means output.

23. An image display device comprising:
an image display means;
a luminance gradient forming means for forming a luminance gradient wherein, when the image display means displays a display screen of a full-white signal, the image display means substantially continuously decreases luminance of the image display means from substantially a center portion of the display screen towards a peripheral portion thereof without increasing luminance of the center portion, wherein the luminance gradient forming means comprises:
- a position detecting means for detecting two-dimensional coordinate data of the video signal in an image;
- a luminance level detecting means for detecting signal levels of a video signal for respective pixels;
- an operating time detecting means for detecting image display time;
- a first lookup table for modulating a luminance for forming a predetermined luminance gradient from substantially the center of the display screen towards a peripheral portion, the first lookup table for storing first multiplication gains corresponding to two-dimensional coordinate data, for receiving two-dimensional coordinate data from the position detecting means, and for outputting the first multiplication gains corresponding to the received data;
- a fourth lookup table for compensating a γ value affected by fluctuation of peak luminance caused by variation over time, the fourth lookup table for storing fourth multiplication gains determined corresponding to image display time and signal levels, for receiving image display time data from the operating time detecting means and luminance level data from the luminance level detecting means, and for outputting the fourth multiplication gains corresponding to the received data;
- a fourth multiplying means for multiplying the signal levels of the video signal by the fourth multiplication gains outputted from the fourth lookup table; and
- a seventh multiplying means for multiplying the results of the multiplying of the fourth multiplying means by the first multiplication gains outputted from the first lookup table, for calculating a seventh multiplying means output, wherein the image display means is for displaying an image according to the seventh multiplying means output.

24. An image display device comprising:
an image display means;
a luminance gradient forming means for forming a luminance gradient wherein, when the image display means displays a display screen of a full-white signal, the image display means substantially continuously decreases luminance of the image display means from substantially a center portion of the display screen towards a peripheral portion thereof without increasing luminance of the center portion, wherein the luminance gradient forming means comprises:
- a position detecting means for detecting two-dimensional coordinate data of the video signal in an image;
- a luminance level detecting means for detecting signal levels of a video signal for respective pixels;
- a time variation detecting means for detecting levels of luminance variation over time;
- a first lookup table for modulating a luminance for forming a predetermined luminance gradient from substantially the center of the display screen towards a peripheral portion, the first lookup table for storing first multiplication gains corresponding to two-dimensional coordinate data, for receiving two-dimensional coordinate data from the position detecting means, and for outputting the first multiplication gains corresponding to the received data;
- a fifth lookup table for compensating a γ value affected by fluctuation of peak luminance caused by variation over time, the fifth lookup table for storing fifth multiplication gains determined corresponding to levels of variation over time and signal levels, for receiving level data of variation over time from the time variation detecting means and luminance level data from the luminance level detecting means, and for outputting the fifth multiplication gains corresponding to the received data;
- a fifth multiplying means for multiplying the signal levels of the video signal by the fifth multiplication gains outputted from the fifth lookup table; and
- an eighth multiplying means for multiplying the results of the multiplying of the fifth multiplying means by the first multiplication gains outputted from the first lookup table, for calculating a eighth multiplying means output, wherein the image display means is for displaying an image according to the eighth multiplying means output.

25. An image display device comprising a display screen for displaying a brightness index BI substantially the same within the display screen, the brightness index BI defined by a function $$BI = a \times L + b \times CR + d \times \gamma M + g = a \times L + b \times L/(OFF+BG) + d \times \gamma M + g = a \times L + b/(1/Cr + BG/L) + d \times \gamma M + g,$$

where L is a luminance when the display screen displays a full-white signal, CR is a photopic contrast, Cr is a scotopic contrast, γM is a gray level characteristic coefficient, OFF is a luminance when the display screen displays a full-black display and ambient light is not present, and BG is an increase in luminance caused by ambient light.

26. The image display device according to claim 25, wherein $$0.00423339 - 0.002671539 \leq a \leq 0.00423339 + 0.002671539;$$

$$0.007648902 - 0.005754385 \leq b \leq 0.007648902 + 0.005754385;$$

$$-79.52542076 - 18.92439144 \leq d \leq -79.52542076 + 18.92439144;$$

and $$-0.7131531895 - 0.16046239 \leq g \leq -0.7131531895 + 0.16046239.$$

27. The image display device according to claim 25, comprising:
- an ambient light detecting means for detecting ambient light levels on a display screen;
- a lookup table for storing third multiplication gains for compensating the brightness index varied by ambient light to be uniform over the display screen, and for output of the multiplication gains corresponding to ambient light level data from the ambient light detecting means;
- a multiplying means for multiplying signal levels of a video signal by the multiplication gains outputted from the lookup table, for calculating a multiplying means output; and
- an image display means for displaying an image according to the multiplying means output.

28. The image display device according to claim 25, comprising:
- an operating time detecting means for detecting image display time;

a lookup table for storing multiplication gains for compensating the brightness index caused to fluctuate by operating time to be uniform over the display screen, and for outputting the multiplication gains corresponding to operating time data from the operating time detecting means;

a multiplying means for multiplying signal levels of a video signal by the multiplication gains outputted from the lookup table, for calculating a multiplying means output; and an image display means for displaying an image according to the multiplying output.

29. The image display device according to claim 25, comprising:

a time variation detecting means for detecting levels of luminance variation over time;

a lookup table for storing multiplication gains for compensating the brightness index caused to fluctuate by variation over time to be uniform over the display screen, and for outputting the multiplication gains corresponding to data of variation over time supplied from the time variation detecting means;

a multiplying means for multiplying signal levels of a video signal by the multiplication gains outputted from the lookup table, for calculating a multiplying means output; and an image display means for displaying an image according to the multiplying means output.

30. An image display device comprising:

a luminance gradient forming means; and an image display means; wherein the luminance gradient forming means is for substantially continuously decreasing a brightness index BI from substantially the center of a display image to a peripheral portion thereof when the display means displays a full-white signal, the brightness index BI defined by a function $$BI=a\times L+b\times CR+d\times \gamma M+g=a\times L+b\times L/(OFF+BG)+d\times \gamma M+g=a\times L+b/(1/Cr+BG/L)+d\times \gamma M+g,$$

where L is a luminance when the image display means displays a full-white signal, CR is a photopic contrast, Cr is a scotopic contrast, γM is a gray level characteristic coefficient, OFF is a luminance when the image display means displays a full-black display when ambient light causes no influence and BG is an increase in luminance caused by ambient light.

31. The image display device according to claim 30, wherein $$0.00423339-0.002671539 \leq a \leq 0.00423339+0.002671539;$$

$$0.007648902-0.005754385 \leq b \leq 0.007648902+0.005754385;$$

$$-79.52542076-18.92439144 \leq d \leq -79.52542076-18.92439144;$$

and $$-0.7131531895-0.16046239 \leq g \leq -0.7131531895+0.16046239.$$

32. The image display device according to claim 30, further comprising a brightness index improving means, wherein the brightness index improving means is for varying gray level characteristics in the display screen.

33. The image display device according to claim 32, wherein the brightness index improving means further comprises a lookup table for specifying a gray level characteristic for each pixel in an image.

34. The image display device according to claim 32, wherein the brightness index improving means comprises display element interface means and is for varying a gain of a level shifter.

35. The image display device according to claim 32, wherein the brightness index improving means comprises an extraction voltage varying means.

36. The image display device according to claim 32, wherein the brightness index improving means is for compensating the brightness index to be substantially uniform over the entire area of the display screen.

37. The image display device according to claim 32, wherein the brightness index improving means is for compensating the brightness index to be substantially uniform within the entire area of a display screen region having a screen diagonal ratio of 0.5.

38. The image display device according to claim 32, wherein the brightness index improving means is for correcting a distribution profile of the brightness index in the display screen.

39. The image display device according to claim 32, wherein the brightness index improving means is for correcting a gradient slope of the brightness index.

40. The image display device according to claim 32, wherein the brightness index improving means is for correcting substantially periodic luminance variation in the display screen.

41. The image display device according to claim 30, wherein the luminance gradient forming means comprises:

a position detecting means for detecting two-dimensional coordinate data of the video signal in an image;

a luminance level detecting means for detecting signal levels of a video signal for respective pixels;

an ambient light detecting means for detecting ambient light levels on a display screen;

a first lookup table for substantially continuously decreasing a brightness index BI from substantially a center portion of the display screen towards a peripheral portion, the first lookup table for storing first multiplication gains corresponding to two-dimensional coordinate data, for receiving two-dimensional coordinate data from the position detecting means, and for output of the first multiplication gains corresponding to the received data;

a third lookup table for compensating a brightness index affected by contrast fluctuation caused by ambient light, the third lookup table for storing third multiplication gains determined corresponding to ambient light levels and signal levels, for receiving ambient light level data from the ambient light detecting means and luminance level data from the luminance level detecting means, and for output of the third multiplication gains corresponding to the received data;

a third multiplying means for multiplying the signal levels of the video signal by the third multiplication gains outputted from the third lookup table; and a sixth multiplying means for multiplying results of the multiplying of the third multiplying means by the first multiplication gains outputted from the first lookup table, for calculating a sixth multiplying means output; and the image display means for displaying an image according to the six multiplying means output.

42. The image display means according to claim 30, wherein the luminance forming means comprises:

a position detecting means for detecting two-dimensional coordinate data of the video signal in an image;

a luminance level detecting means for detecting signal levels of a video signal for respective pixels;

an operating time detecting means for detecting image display time;

a first lookup table for substantially continuously decreasing a brightness index BI from substantially a center portion of the display screen towards a peripheral portion, the first lookup table for storing first multiplication gains corresponding to two-dimensional coordinate data, for receiving two-dimensional coordinate data from the position detecting means, and for output of the first multiplication gains corresponding to the received data;

a fourth lookup table for compensating the brightness index affected by peak luminance fluctuation caused by variation over time, the fourth lookup table for storing fourth multiplication gains determined corresponding to image display time and signal levels, for receiving image display time data from the operating time detecting means and luminance level data from the luminance level detecting means, and for output of the fourth multiplication gains corresponding to the received data;

a fourth multiplying means for multiplying the signal levels of the video signal by the fourth multiplication gains outputted from the fourth lookup table; and a seventh multiplying means for multiplying the results of the multiplying of the fourth multiplying means by the first multiplication gains output from the first lookup table, for calculating a seventh multiplying means output; and the image display means for displaying an image according to the seventh multiplying means output.

43. The image display device according to claim 30, wherein the luminance gradient forming means comprises:

a position detecting means for detecting two-dimensional coordinate data of the video signal in an image;

a luminance level detecting means for detecting signal levels of a video signal for respective pixels;

a time variation detecting means for detecting levels of luminance variation over time;

a first lookup table for substantially continuously decreasing a brightness index BI from substantially a center portion of the display screen towards a peripheral portion, the first lookup table for storing first multiplication gains corresponding to two-dimensional coordinate data, for receiving two-dimensional coordinate data from the position detecting means, and for output of the first multiplication gains corresponding to the received data;

a fifth lookup table for compensating a brightness index affected by fluctuation of peak luminance caused by variation over time, the fifth lookup table for storing fifth multiplication gains determined corresponding to levels of variation over time and signal levels, for receiving level data of variation over time from the time variation detecting means and luminance level data from the luminance level detecting means, and for output of fifth multiplication gains corresponding to the received data;

a fifth multiplying means for multiplying the signal levels of the video signal by the fifth multiplication gains output from the fifth lookup table; and an eighth multiplying means for multiplying the results of the multiplying of the fifth multiplying means by the first multiplication gains output from the first lookup table, for calculating an eighth multiplying means output; and the image display means for displaying an image according to the eighth multiplying means output.

* * * * *

UNITED STATES PATENT AND TRADEMARK OFFICE
CERTIFICATE OF CORRECTION

PATENT NO.    : 6,791,566 B1
DATED         : September 14, 2004
INVENTOR(S)   : Yasunori Kuratomi et al.

It is certified that error appears in the above-identified patent and that said Letters Patent is hereby corrected as shown below:

Column 22,
Line 17, delete "being"; and
Line 18, insert -- being -- after "members."

Signed and Sealed this

Fifth Day of April, 2005

JON W. DUDAS
*Director of the United States Patent and Trademark Office*